(12) United States Patent
Ahn et al.

(10) Patent No.: US 12,375,447 B2
(45) Date of Patent: Jul. 29, 2025

(54) EFFICIENT PACKET CAPTURE FOR CYBER THREAT ANALYSIS

(71) Applicant: Centripetal Networks, LLC, Portsmouth, NH (US)

(72) Inventors: David K. Ahn, Winston-Salem, NC (US); Sean Moore, Hollis, NH (US)

(73) Assignee: Centripetal Networks, LLC, Portsmouth, NH (US)

( * ) Notice: Subject to any disclaimer, the term of this patent is extended or adjusted under 35 U.S.C. 154(b) by 0 days.

(21) Appl. No.: 18/210,896

(22) Filed: Jun. 16, 2023

(65) Prior Publication Data

US 2023/0336527 A1    Oct. 19, 2023

Related U.S. Application Data

(63) Continuation of application No. 15/382,806, filed on Dec. 19, 2016, now Pat. No. 11,729,144.

(Continued)

(51) Int. Cl.
    *H04L 9/40* (2022.01)
(52) U.S. Cl.
    CPC ...... *H04L 63/0236* (2013.01); *H04L 63/0263* (2013.01); *H04L 63/1408* (2013.01); *H04L 63/1425* (2013.01); *H04L 63/20* (2013.01)
(58) Field of Classification Search
    CPC ............ H04L 63/0236; H04L 63/0263; H04L 63/1408; H04L 63/1425; H04L 63/20
    See application file for complete search history.

(56) References Cited

U.S. PATENT DOCUMENTS

| | | |
|---|---|---|
| 5,226,141 A | 7/1993 | Esbensen |
| 6,098,172 A | 8/2000 | Coss et al. |

(Continued)

FOREIGN PATENT DOCUMENTS

| | | |
|---|---|---|
| AU | 2005328336 B2 | 9/2011 |
| AU | 2006230171 B2 | 6/2012 |

(Continued)

OTHER PUBLICATIONS

Jul. 26, 2018 (US) Declaration of Kevin Jeffay, PhD in Support of Second Petition for Inter Partes Review of U.S. Pat. No. 9,137,205—IPR2018-01444.

(Continued)

*Primary Examiner* — Kevin Bechtel
*Assistant Examiner* — Forrest L Carey
(74) *Attorney, Agent, or Firm* — Banner & Witcoff, Ltd.

(57) ABSTRACT

Methods, systems, and computer-readable media for efficiently detecting threat incidents for cyber threat analysis are described herein. In various embodiments, a computing device, which may be located at a boundary between a protected network associated with the enterprise and an unprotected network, may combine one or more threat indicators received from one or more threat intelligence providers; may generate one or more packet capture and packet filtering rules based on the combined threat indicators; and, may capture or filter, on a packet-by-packet basis, at least one packet based on the generated rules. In other embodiments, a computing device may generate a packet capture file comprising raw packet content and corresponding threat context information, wherein the threat context information may comprise a filtering rule and an associated threat indicator that caused the packet to be captured.

30 Claims, 6 Drawing Sheets

Related U.S. Application Data

(60) Provisional application No. 62/274,541, filed on Jan. 4, 2016.

(56) References Cited

U.S. PATENT DOCUMENTS

| | | | |
|---|---|---|---|
| 6,147,976 A | 11/2000 | Shand et al. | |
| 6,226,372 B1 | 5/2001 | Beebe et al. | |
| 6,279,113 B1 | 8/2001 | Vaidya | |
| 6,317,837 B1 | 11/2001 | Kenworthy | |
| 6,484,261 B1 | 11/2002 | Wiegel | |
| 6,611,875 B1 | 8/2003 | Chopra et al. | |
| 6,662,235 B1 | 12/2003 | Callis et al. | |
| 6,678,835 B1 | 1/2004 | Shah et al. | |
| 6,826,694 B1 | 11/2004 | Dutta et al. | |
| 6,907,042 B1 | 6/2005 | Oguchi | |
| 6,971,028 B1 | 11/2005 | Lyle et al. | |
| 7,089,581 B1 | 8/2006 | Nagai et al. | |
| 7,095,716 B1 | 8/2006 | Ke et al. | |
| 7,107,613 B1 | 9/2006 | Chen et al. | |
| 7,143,438 B1 | 11/2006 | Coss et al. | |
| 7,152,240 B1 | 12/2006 | Green et al. | |
| 7,185,368 B2 | 2/2007 | Copeland, III | |
| 7,215,637 B1 | 5/2007 | Ferguson et al. | |
| 7,225,269 B2 | 5/2007 | Watanabe | |
| 7,227,842 B1 | 6/2007 | Ji et al. | |
| 7,237,267 B2 | 6/2007 | Rayes et al. | |
| 7,254,114 B1 | 8/2007 | Turner et al. | |
| 7,263,099 B1 | 8/2007 | Woo et al. | |
| 7,296,288 B1 | 11/2007 | Hill et al. | |
| 7,299,353 B2 | 11/2007 | Le Pennec et al. | |
| 7,320,022 B2 | 1/2008 | Hayter et al. | |
| 7,331,061 B1 | 2/2008 | Ramsey et al. | |
| 7,478,429 B2 | 1/2009 | Lyon | |
| 7,499,412 B2 | 3/2009 | Matityahu et al. | |
| 7,539,186 B2 | 5/2009 | Aerrabotu et al. | |
| 7,594,270 B2 | 9/2009 | Church et al. | |
| 7,610,621 B2 | 10/2009 | Turley et al. | |
| 7,684,400 B2 | 3/2010 | Govindarajan et al. | |
| 7,710,885 B2 | 5/2010 | Ilnicki et al. | |
| 7,721,084 B2 | 5/2010 | Salminen et al. | |
| 7,792,775 B2 | 9/2010 | Matsuda | |
| 7,814,158 B2 | 10/2010 | Malik | |
| 7,814,546 B1 | 10/2010 | Strayer et al. | |
| 7,818,794 B2 | 10/2010 | Wittman | |
| 7,849,502 B1 | 12/2010 | Bloch et al. | |
| 7,913,303 B1 | 3/2011 | Rouland et al. | |
| 7,954,143 B2 | 5/2011 | Aaron | |
| 8,004,994 B1 | 8/2011 | Darisi et al. | |
| 8,009,566 B2 | 8/2011 | Zuk et al. | |
| 8,037,517 B2 | 10/2011 | Fulp et al. | |
| 8,042,149 B2 | 10/2011 | Judge | |
| 8,042,167 B2 | 10/2011 | Fulp et al. | |
| 8,117,655 B2 | 2/2012 | Spielman | |
| 8,156,206 B2 | 4/2012 | Kiley et al. | |
| 8,176,561 B1 | 5/2012 | Hurst et al. | |
| 8,219,675 B2 | 7/2012 | Ivershen | |
| 8,271,645 B2 | 9/2012 | Rajan et al. | |
| 8,306,994 B2 | 11/2012 | Kenworthy | |
| 8,307,029 B2 | 11/2012 | Davis et al. | |
| 8,331,234 B1 | 12/2012 | Newton et al. | |
| 8,413,238 B1 | 4/2013 | Sutton | |
| 8,422,391 B2 | 4/2013 | Zhu | |
| 8,495,725 B2 | 7/2013 | Ahn | |
| 8,510,821 B1 | 8/2013 | Brandwine et al. | |
| 8,726,379 B1 | 5/2014 | Stiansen et al. | |
| 8,806,638 B1 | 8/2014 | Mani | |
| 8,832,832 B1 | 9/2014 | Visbal | |
| 8,839,417 B1 | 9/2014 | Jordan | |
| 8,856,926 B2 | 10/2014 | Narayanaswamy et al. | |
| 8,935,785 B2 | 1/2015 | Pandrangi | |
| 9,094,445 B2 | 7/2015 | Moore et al. | |
| 9,124,552 B2 | 9/2015 | Moore | |
| 9,137,205 B2 | 9/2015 | Rogers et al. | |
| 9,154,446 B2 | 10/2015 | Gemelli et al. | |
| 9,160,713 B2 | 10/2015 | Moore | |
| 9,172,627 B2 | 10/2015 | Kjendal et al. | |
| 9,185,127 B2 | 11/2015 | Neou et al. | |
| 9,342,691 B2 | 5/2016 | Maestas | |
| 9,392,003 B2 | 7/2016 | Amsler | |
| 9,413,722 B1 | 8/2016 | Ahn et al. | |
| 9,419,942 B1 | 8/2016 | Buruganahalli et al. | |
| 9,503,529 B2 | 11/2016 | Li et al. | |
| 9,531,672 B1 | 12/2016 | Li et al. | |
| 9,634,911 B2 | 4/2017 | Meloche | |
| 9,686,193 B2 | 6/2017 | Moore | |
| 10,205,733 B1 | 2/2019 | Park et al. | |
| 2001/0039579 A1 | 11/2001 | Trcka et al. | |
| 2001/0039624 A1 | 11/2001 | Kellum | |
| 2002/0016858 A1 | 2/2002 | Sawada et al. | |
| 2002/0038339 A1 | 3/2002 | Xu | |
| 2002/0049899 A1 | 4/2002 | Kenworthy | |
| 2002/0083345 A1 | 6/2002 | Halliday et al. | |
| 2002/0112188 A1 | 8/2002 | Syvanne | |
| 2002/0152209 A1 | 10/2002 | Merugu et al. | |
| 2002/0164962 A1 | 11/2002 | Mankins et al. | |
| 2002/0165949 A1 | 11/2002 | Na et al. | |
| 2002/0186683 A1 | 12/2002 | Buck et al. | |
| 2002/0198981 A1 | 12/2002 | Corl et al. | |
| 2003/0005122 A1 | 1/2003 | Freimuth et al. | |
| 2003/0014665 A1 | 1/2003 | Anderson et al. | |
| 2003/0018591 A1 | 1/2003 | Komisky | |
| 2003/0035370 A1 | 2/2003 | Brustoloni | |
| 2003/0051026 A1 | 3/2003 | Carter et al. | |
| 2003/0088787 A1 | 5/2003 | Egevang | |
| 2003/0097590 A1 | 5/2003 | Syvanne | |
| 2003/0105976 A1 | 6/2003 | Copeland | |
| 2003/0120622 A1 | 6/2003 | Nurmela et al. | |
| 2003/0123456 A1 | 7/2003 | Denz et al. | |
| 2003/0142681 A1 | 7/2003 | Chen et al. | |
| 2003/0145225 A1 | 7/2003 | Bruton et al. | |
| 2003/0154297 A1 | 8/2003 | Suzuki et al. | |
| 2003/0154399 A1 | 8/2003 | Zuk et al. | |
| 2003/0188192 A1 | 10/2003 | Tang et al. | |
| 2003/0212900 A1 | 11/2003 | Liu et al. | |
| 2003/0220940 A1 | 11/2003 | Futoransky et al. | |
| 2004/0010712 A1 | 1/2004 | Hui et al. | |
| 2004/0015719 A1 | 1/2004 | Lee et al. | |
| 2004/0015905 A1 | 1/2004 | Huima | |
| 2004/0073655 A1 | 4/2004 | Kan et al. | |
| 2004/0088542 A1 | 5/2004 | Daude et al. | |
| 2004/0093513 A1 | 5/2004 | Cantrell et al. | |
| 2004/0098511 A1 | 5/2004 | Lin et al. | |
| 2004/0114518 A1 | 6/2004 | MacFaden et al. | |
| 2004/0123220 A1 | 6/2004 | Johnson et al. | |
| 2004/0131056 A1 | 7/2004 | Dark | |
| 2004/0148520 A1 | 7/2004 | Talpade et al. | |
| 2004/0151155 A1 | 8/2004 | Jouppi | |
| 2004/0172529 A1 | 9/2004 | Culbert | |
| 2004/0172557 A1 | 9/2004 | Nakae et al. | |
| 2004/0177139 A1 | 9/2004 | Schuba et al. | |
| 2004/0193943 A1 | 9/2004 | Angelino et al. | |
| 2004/0199629 A1 | 10/2004 | Bomer et al. | |
| 2004/0205360 A1 | 10/2004 | Norton et al. | |
| 2004/0240447 A1* | 12/2004 | Dorbolo | H04L 45/745 370/395.32 |
| 2004/0250124 A1 | 12/2004 | Chesla et al. | |
| 2005/0010765 A1 | 1/2005 | Swander et al. | |
| 2005/0024189 A1 | 2/2005 | Weber | |
| 2005/0071650 A1 | 3/2005 | Jo et al. | |
| 2005/0076227 A1 | 4/2005 | Kang et al. | |
| 2005/0108557 A1 | 5/2005 | Kayo et al. | |
| 2005/0114704 A1 | 5/2005 | Swander | |
| 2005/0117576 A1 | 6/2005 | McDysan et al. | |
| 2005/0125697 A1 | 6/2005 | Tahara | |
| 2005/0138204 A1 | 6/2005 | Iyer et al. | |
| 2005/0138353 A1 | 6/2005 | Spies et al. | |
| 2005/0141537 A1 | 6/2005 | Kumar et al. | |
| 2005/0183140 A1 | 8/2005 | Goddard | |
| 2005/0229246 A1 | 10/2005 | Rajagopal et al. | |
| 2005/0249214 A1 | 11/2005 | Peng | |
| 2005/0251570 A1 | 11/2005 | Heasman et al. | |
| 2005/0257264 A1 | 11/2005 | Stolfo et al. | |
| 2005/0283823 A1 | 12/2005 | Okajo et al. | |
| 2005/0286522 A1 | 12/2005 | Paddon et al. | |

(56) References Cited

U.S. PATENT DOCUMENTS

| | | |
|---|---|---|
| 2006/0031928 A1 | 2/2006 | Conley et al. |
| 2006/0048142 A1 | 3/2006 | Roese et al. |
| 2006/0053491 A1 | 3/2006 | Khuti et al. |
| 2006/0070122 A1 | 3/2006 | Bellovin |
| 2006/0080733 A1 | 4/2006 | Khosmood et al. |
| 2006/0085849 A1 | 4/2006 | Culbert |
| 2006/0104202 A1 | 5/2006 | Reiner |
| 2006/0114899 A1 | 6/2006 | Toumura et al. |
| 2006/0133377 A1 | 6/2006 | Jain |
| 2006/0136987 A1 | 6/2006 | Okuda |
| 2006/0137009 A1 | 6/2006 | Chesla |
| 2006/0146879 A1 | 7/2006 | Anthias et al. |
| 2006/0159028 A1 | 7/2006 | Curran-Gray et al. |
| 2006/0195896 A1 | 8/2006 | Fulp et al. |
| 2006/0212572 A1 | 9/2006 | Afek et al. |
| 2006/0248580 A1 | 11/2006 | Fulp et al. |
| 2006/0262798 A1 | 11/2006 | Joshi et al. |
| 2007/0056038 A1 | 3/2007 | Lok |
| 2007/0083924 A1 | 4/2007 | Lu |
| 2007/0097976 A1 | 5/2007 | Wood et al. |
| 2007/0118894 A1 | 5/2007 | Bhatia |
| 2007/0211644 A1 | 9/2007 | Ottamalika et al. |
| 2007/0240208 A1 | 10/2007 | Yu et al. |
| 2007/0291789 A1 | 12/2007 | Kutt et al. |
| 2008/0005795 A1 | 1/2008 | Acharya et al. |
| 2008/0028467 A1 | 1/2008 | Kommareddy et al. |
| 2008/0043739 A1 | 2/2008 | Suh et al. |
| 2008/0072307 A1 | 3/2008 | Maes |
| 2008/0077705 A1 | 3/2008 | Li et al. |
| 2008/0080493 A1 | 4/2008 | Weintraub et al. |
| 2008/0086435 A1 | 4/2008 | Chesla |
| 2008/0101234 A1 | 5/2008 | Nakil et al. |
| 2008/0163333 A1 | 7/2008 | Kasralikar |
| 2008/0201772 A1 | 8/2008 | Mondaeev et al. |
| 2008/0229415 A1 | 9/2008 | Kapoor et al. |
| 2008/0235755 A1 | 9/2008 | Blaisdell et al. |
| 2008/0279196 A1 | 11/2008 | Friskney et al. |
| 2008/0301765 A1 | 12/2008 | Nicol et al. |
| 2008/0313738 A1 | 12/2008 | Enderby |
| 2008/0320116 A1 | 12/2008 | Briggs |
| 2009/0028160 A1 | 1/2009 | Eswaran et al. |
| 2009/0103524 A1 | 4/2009 | Mantripragada et al. |
| 2009/0138938 A1 | 5/2009 | Harrison et al. |
| 2009/0150972 A1 | 6/2009 | Moon et al. |
| 2009/0172800 A1 | 7/2009 | Wool |
| 2009/0222877 A1 | 9/2009 | Diehl et al. |
| 2009/0240698 A1 | 9/2009 | Shukla et al. |
| 2009/0249482 A1 | 10/2009 | Sarathy |
| 2009/0262723 A1 | 10/2009 | Pelletier et al. |
| 2009/0262741 A1 | 10/2009 | Jungck et al. |
| 2009/0300759 A1 | 12/2009 | Wang et al. |
| 2009/0328219 A1 | 12/2009 | Narayanaswamy |
| 2010/0011433 A1 | 1/2010 | Harrison et al. |
| 2010/0011434 A1 | 1/2010 | Kay |
| 2010/0082811 A1 | 4/2010 | Van Der Merwe et al. |
| 2010/0095367 A1 | 4/2010 | Narayanaswamy |
| 2010/0107240 A1 | 4/2010 | Thaler et al. |
| 2010/0115621 A1 | 5/2010 | Staniford et al. |
| 2010/0132027 A1 | 5/2010 | Ou |
| 2010/0195503 A1 | 8/2010 | Raleigh |
| 2010/0199346 A1 | 8/2010 | Ling et al. |
| 2010/0202299 A1 | 8/2010 | Strayer et al. |
| 2010/0211678 A1 | 8/2010 | McDysan et al. |
| 2010/0232445 A1 | 9/2010 | Bellovin |
| 2010/0242098 A1 | 9/2010 | Kenworthy |
| 2010/0268799 A1 | 10/2010 | Maestas |
| 2010/0296441 A1 | 11/2010 | Barkan |
| 2010/0303240 A1 | 12/2010 | Beachem et al. |
| 2011/0055916 A1 | 3/2011 | Ahn |
| 2011/0055923 A1 | 3/2011 | Thomas |
| 2011/0088092 A1 | 4/2011 | Nguyen et al. |
| 2011/0141900 A1 | 6/2011 | Jayawardena et al. |
| 2011/0185055 A1 | 7/2011 | Nappier et al. |
| 2011/0214157 A1 | 9/2011 | Korsunsky et al. |
| 2011/0270956 A1 | 11/2011 | McDysan et al. |
| 2011/0277034 A1 | 11/2011 | Hanson |
| 2011/0320870 A1* | 12/2011 | Kenigsberg ............ H04L 43/12 714/25 |
| 2012/0023576 A1 | 1/2012 | Sorensen et al. |
| 2012/0084866 A1 | 4/2012 | Stolfo |
| 2012/0106354 A1 | 5/2012 | Pleshek et al. |
| 2012/0113987 A1 | 5/2012 | Riddoch et al. |
| 2012/0240135 A1 | 9/2012 | Risbood et al. |
| 2012/0240185 A1 | 9/2012 | Kapoor et al. |
| 2012/0264443 A1 | 10/2012 | Ng et al. |
| 2012/0314617 A1 | 12/2012 | Erichsen et al. |
| 2012/0331543 A1 | 12/2012 | Bostrom et al. |
| 2013/0047020 A1 | 2/2013 | Hershko et al. |
| 2013/0055373 A1 | 2/2013 | Beacham et al. |
| 2013/0059527 A1 | 3/2013 | Hasesaka et al. |
| 2013/0061294 A1 | 3/2013 | Kenworthy |
| 2013/0104236 A1 | 4/2013 | Ray et al. |
| 2013/0117852 A1 | 5/2013 | Stute |
| 2013/0139236 A1 | 5/2013 | Rubinstein et al. |
| 2013/0212680 A1 | 8/2013 | Winn et al. |
| 2013/0254766 A1 | 9/2013 | Zuo et al. |
| 2013/0262655 A1 | 10/2013 | Desch nes et al. |
| 2013/0291100 A1 | 10/2013 | Ganapathy et al. |
| 2013/0305311 A1 | 11/2013 | Puttaswamy Naga et al. |
| 2014/0075510 A1 | 3/2014 | Sonoda et al. |
| 2014/0082204 A1 | 3/2014 | Shankar et al. |
| 2014/0082730 A1 | 3/2014 | Vashist et al. |
| 2014/0115654 A1 | 4/2014 | Rogers et al. |
| 2014/0150051 A1 | 5/2014 | Bharali et al. |
| 2014/0201123 A1 | 7/2014 | Ahn et al. |
| 2014/0215561 A1 | 7/2014 | Roberson et al. |
| 2014/0215574 A1 | 7/2014 | Erb et al. |
| 2014/0259170 A1 | 9/2014 | Amsler |
| 2014/0280778 A1 | 9/2014 | Paxton |
| 2014/0281030 A1 | 9/2014 | Cui et al. |
| 2014/0283004 A1 | 9/2014 | Moore |
| 2014/0283030 A1 | 9/2014 | Moore et al. |
| 2014/0317397 A1 | 10/2014 | Martini |
| 2014/0337613 A1 | 11/2014 | Martini |
| 2014/0366132 A1 | 12/2014 | Stiansen et al. |
| 2015/0033336 A1 | 1/2015 | Wang et al. |
| 2015/0106930 A1 | 4/2015 | Honda et al. |
| 2015/0128274 A1 | 5/2015 | Giokas |
| 2015/0135325 A1 | 5/2015 | Stevens et al. |
| 2015/0207809 A1 | 7/2015 | Macaulay |
| 2015/0237012 A1 | 8/2015 | Moore |
| 2015/0244734 A1 | 8/2015 | Olson et al. |
| 2015/0256431 A1 | 9/2015 | Buchanan et al. |
| 2015/0304354 A1 | 10/2015 | Rogers et al. |
| 2015/0334125 A1 | 11/2015 | Bartos et al. |
| 2015/0341389 A1 | 11/2015 | Kurakami |
| 2015/0350229 A1 | 12/2015 | Mitchell |
| 2015/0372977 A1 | 12/2015 | Yin |
| 2015/0373043 A1 | 12/2015 | Wang et al. |
| 2016/0020968 A1 | 1/2016 | Aumann et al. |
| 2016/0028751 A1 | 1/2016 | Cruz Mota et al. |
| 2016/0065611 A1 | 3/2016 | Fakeri-Tabrizi et al. |
| 2016/0112443 A1 | 4/2016 | Grossman et al. |
| 2016/0119365 A1 | 4/2016 | Barel |
| 2016/0191558 A1 | 6/2016 | Davison |
| 2016/0205069 A1 | 7/2016 | Blocher et al. |
| 2016/0219065 A1* | 7/2016 | Dasgupta ............ H04L 63/1441 |
| 2016/0285706 A1 | 9/2016 | Rao |
| 2016/0294870 A1 | 10/2016 | Banerjee et al. |
| 2016/0308894 A1 | 10/2016 | Ahn et al. |
| 2016/0366099 A1 | 12/2016 | Jordan |
| 2017/0142144 A1* | 5/2017 | Weinberger ......... H04L 63/1408 |
| 2017/0223046 A1 | 8/2017 | Singh |
| 2017/0272469 A1 | 9/2017 | Kraemer et al. |
| 2018/0288074 A1 | 10/2018 | Thayer et al. |
| 2019/0373052 A1 | 12/2019 | Pollitt et al. |

FOREIGN PATENT DOCUMENTS

| | | |
|---|---|---|
| CA | 2600236 A1 | 10/2006 |
| EP | 1006701 A2 | 6/2000 |
| EP | 1313290 A1 | 5/2003 |
| EP | 1484884 A2 | 12/2004 |
| EP | 1677484 A2 | 7/2006 |

(56) References Cited

FOREIGN PATENT DOCUMENTS

| | | |
|---|---|---|
| EP | 2385676 A1 | 11/2011 |
| EP | 2482522 A1 | 8/2012 |
| EP | 2498442 A1 | 9/2012 |
| EP | 1864226 B1 | 5/2013 |
| KR | 20010079361 A | 8/2001 |
| WO | 2005046145 A1 | 5/2005 |
| WO | 2006093557 A2 | 9/2006 |
| WO | 2006105093 A2 | 10/2006 |
| WO | 2007109541 A2 | 9/2007 |
| WO | 2011038420 A2 | 3/2011 |
| WO | 2012146265 A1 | 11/2012 |
| WO | 2016196683 A1 | 12/2016 |

OTHER PUBLICATIONS

Jul. 27, 2018 (US) First Petition for Inter Partes Review of U.S. Pat. No. 9,137,205—IPR2018-01443.
Jul. 27, 2018 (US) Second Petition for Inter Partes Review of U.S. Pat. No. 9,137,205—IPR2018-01444.
Jul. 5, 2018 (US) Non-Final Office Action—U.S. Appl. No. 15/413,750.
Mar. 15, 2018 (EP) Second Communication pursuant to Article 94(3) EPC—App. 13765547.8.
Mar. 16, 2018 (EP) Communication Pursuant to Rule 164(2)(b) and Article 94(3) EPC—App. 15722292.8.
Mar. 21, 2018 (AU) First Examination Report—App. 2015382393.
Mar. 8, 2018 (US) Non-Final Office Action—U.S. Appl. No. 14/745,207.
May 25, 2018 (US) Notice of Allowance—U.S. Appl. No. 15/413,834.
Nov. 14, 2018 (US) Final Office Action—U.S. Appl. No. 14/745,207.
Oct. 12, 2018 (US) Non-Final Office Action—U.S. Appl. No. 16/039,896.
Oct. 4, 2018 (US) Non-Final Office Action—U.S. Appl. No. 16/030,374.
Oct. 4, 2018 (US) Notice of Allowance—U.S. Appl. No. 15/827,477.
Sep. 27, 2018 (WO) International Search Report and Written Opinion—App. PCT/US2018/043367.
Sep. 4, 2018 (WO) International Search Report and Written Opinion—App. PCT/US2018/041355.
Sep. 27, 2018 (US) Non-Final Office Action—U.S. Appl. No. 15/614,956.
Feb. 21, 2019 (US) Final Office Action—U.S. Appl. No. 15/382,806.
Feb. 6, 2019 (US) Final Office Action—U.S. Appl. No. 15/413,750.
Feb. 6, 2019 (US) Notice of Allowance and Fees Due—U.S. Appl. No. 16/039,896.
Jan. 24, 2019 (US) Notice of Allowance—U.S. Appl. No. 15/610,995.
Mar. 11, 2019 (US) Final Office Action—U.S. Appl. No. 16/030,354.
A. Feldmann et al., "Tradeoffs for Packet Classification", Proceedings of the IEEE Infocom, 397-413, 2000.
A. Hari et al., "Detecting and Resolving Packet Filter Conflicts", Proceedings of IEEE INFOCOM, 1203-1212, 2000.
Acharya et al., "OPTWALL: A Hierarchical Traffic-Aware Firewall," Department of Computer Science, Telecommunications Program, University of Pittsburgh, pp. 1-11 (2007).
Anonymous: "The Distribution of Malicious Domains," The DomainTools Report, 2016 Edition, Mar. 9, 2016 (Mar. 9, 2016), pp. 1-11, XP055502306, Retrieved from: https://www.domaintools.com/resources/white-papers/the-domaintools-report-the-distribution-of-malicious-domains.
Bellion, "High Performance Packet Classification", http://www.hipac.org (Publication Date Unknown).
Blake, et al., "An Architecture for Differentiated Services," Network Working Group RFC 2475, Dec. 1998, 36 pages.
Blake, et al., "An Architecture for Differentiated Services," also known as the Diffserv architecture, as defined in RFC 2475, Network Working Group, Dec. 1998, 36 pages.
C. Benecke, "A Parallel Packet Screen for High Speed Networks", Proceedings of the 15th Annual Computer Security Applications Conference, 1999.
Chen, et al., "Research on the Anomaly Discovering Algorithm of the Packet Filtering Rule Sets," Sep. 2010, First International Confererence on Pervasive Computing, Signal Processing and Applications, pp. 362-366.
D. Comer, "Analysis of a Heuristic for Full Trie Minimization", ACM Transactions on Database Systems, 6(3): 513-537, Sep. 1981.
D. Decasper et al., "Router Plugins: A Software Architecture for Next-Generation Routers", IEEE/ACM Transactions on Networking, 8(1): Feb. 2000.
D. Eppstein et al., "Internet Packet Filter Management and Rectangle Geometry", Proceedings of the Symposium on Discrete Algorithms, 827-835, 2001.
E. Al-Shaer et al., "Firewall Policy Advisor for Anomaly Discovery and Rule Editing", Proceedings of the IFIP/IEEE International Symposium on Integrated Network Management, 2003.
E. Al-Shaer et al., "Modeling and Management of Firewall Policies", IEEE Transactions on Network and Service Management, 1(1): 2004.
E. Fulp et al., "Network Firewall Policy Tries", Technical Report, Computer Science Department, Wake Forest University, 2004.
E. Fulp, "Optimization of Network Firewall Policies Using Ordered Sets and Directed Acyclical Graphs", Technical Report, Computer Scient Department, Wake Forest University, Jan. 2004.
E. Fulp, "Preventing Denial of Service Attacks on Quality of Service", Proceedings of the 2001 DARPA Information Survivability Conference and Exposition II, 2001.
E.L. Lawler, "Sequencing Jobs to Minimize Total Weighted Completion Time Subject to Precedence Constraints", Annals of Discrete Mathematics, 2: 75-90, 1978.
E.W. Fulp, "Firewall Architectures for High Speed Networks", U.S. Department of Energy Grant Application, Funded Sep. 2003.
Fulp, "Trie-Based Policy Representations for Network Firewalls," Proceedings of the IEEE International Symposium on Computer Communications (2005).
Fulp, Errin: "CV: Errin Fulp," XP002618346, www.cs.wfu.edu/fulp/ewfPub.html, pp. 1-5 (Copyright 2010).
G. Brightwell et al., "Counting Linear Extensions is #P-Complete", Proceedings of the Twenty-Third Annual ACM Symposium on Theory of Computing, 1991.
G.V. Rooij, "Real Stateful TCP Packet Filtering in IP Filter", Proceedings of the 10th USENIX Security Symposium, 2001.
Greenwald, Michael; "Designing an Academic Firewall: Policy, Practice, and Experience with Surf"; IEEE, Proceedings of SNDSS, 1996.
J. Xu et al., "Design and Evaluation of a High-Performance ATM Firewall Switch and Its Applications", IEEE Journal on Selected Areas in Communications, 17(6): 1190-1200, Jun. 1999.
J.K. Lenstra et al., "Complexity of Scheduling Under Precedence Constraints", Operations Research, 26(1): 22-35, 1978.
Kindervag, et al. "Build Security Into Your Network's DNA: The Zero Trust Network Architecture," Forrester Research Inc.; Nov. 5, 2010, pp. 1-26.
L. Qui et al., "Fast Firewall Implementations for Software and Hardware-Based Routers", Proceedings of ACM Sigmetrics, Jun. 2001.
Lee et al., "Development Framework for Firewall Processors," IEEE, pp. 352-355 (2002).
"Cisco ACNS Softward Configuration Guide for Centrally Managed Deployments," Release 5.5. Text Part No. OL-9136-01, Cisco Systems, Inc., 2006, 944 pages.
"Control Plane Policing Implementation Best Practices"; Cisco Systems; Mar. 13, 2013; <https://web.archive.org/web/20130313135143/http:www.cisco.com/web/about/security/intelligence/coppwp_gs.html>.
"Examining SSL-encrypted Communications: Netronome SSL InspectorTM Solution Overview," Jan. 1, 2008, XP055036015, retrieved from <http://www.infosecurityproductsguide.com/technology/2008/Netronome_Examining_SSL-encrypted_Communications.pdf>, 8 pages.
Sep. 11, 2006—(WO) Written Opinion of the International Searching Authority—App PCT/US05/47008.
Aug. 31, 2007—(EP) Communication Pursuant to Rules 109 and 110—App 05857614.1.
Jul. 3, 2008—(WO) Written Opinion of the International Searching Authority—App PCT/US06/11291.
Jun. 24, 2009—(US) Office Action—U.S. Appl. No. 11/390,976.
Sep. 14, 2009 (US) Office Action—U.S. Appl. No. 11/316,331.

(56) References Cited

OTHER PUBLICATIONS

Apr. 29, 2010—(US) Interview Summary—U.S. Appl. No. 11/390,976.
Aug. 20, 2010—(AU) Office Action—App 2005328336.
Jun. 23, 2010—(US) Final Rejection—U.S. Appl. No. 11/316,331.
Mar. 26, 2010—(US) Final Rejection—U.S. Appl. No. 11/390,976.
Sep. 10, 2010—(AU) Office Action—App 2006230171.
Sep. 30, 2010—(US) Office Action—U.S. Appl. No. 11/390,976.
Apr. 27, 20117—(WO) International Search Report and Written Opinion—App PCT/US2010/054520.
Aug. 25, 2011—(US) Non Final Rejection—U.S. Appl. No. 12/871,806.
Feb. 14, 2011—(EP) Search Report—App 06758213.0.
Jun. 9, 2011—(US) Notice of Allowance—U.S. Appl. No. 11/390,976.
Mar. 3, 2011—(EP) Communication Pursuant to Rules 70(2) and 70a(2)—App 06758213.0.
Mar. 4, 2011—(US) Notice of Allowance—U.S. Appl. No. 11/316,331.
Nov. 11, 2011—(AU) Second Office Action—App 2006230171.
Oct. 18, 2011—(EP) Communication Pursuant to Article 94(3)—App 06 758 213.0.
Aug. 7, 2012—(US) Non Final Rejection—U.S. Appl. No. 12/871,806.
Feb. 6, 2012—(US) Final Rejection—U.S. Appl. No. 12/871,806.
Jun. 9, 2012—(AU) Notice of Acceptance—App 2006230171.
Jun. 26, 2012—(EP) Extended Search Report—App 05857614.1.
Nov. 20, 2012—(EP) Communication under rule 71(3)—App 06 758 213.0.
Nov. 26, 2012—(US) Final Rejection—U.S. Appl. No. 12/871,806.
Apr. 4, 2013—(US) Notice of Allowance—U.S. Appl. No. 12/871,806.
Apr. 18, 2013—(EP) Decision to Grant a European Patent—App 06758212.0.
Jan. 16, 2013—(CA) Office Action—App 2,594,020.
Jan. 17, 2013—(CA) Office Action—App 2,600,236.
Nov. 7, 2013 (WO) International Search Report—App. PCT/US2013/057502.
Jun. 24, 2014 (WO) International Search Report—App. PCT/US2014/023286.
Jun. 26, 2014 (WO) International Search Report—App. PCT/US2014/027723.
Mar. 24, 2014 (WO) International Search Report—App. PCT/US2013/072566.
May 26, 2014—(CA) Office Action—App 2010297968.
Apr. 28, 2015 (WO) International Preliminary Report on Patentability—App. PCT/US2013/057502, dated Apr. 28, 2015.
Dec. 22, 2015—(US) Final Office Action—U.S. Appl. No. 14/714,207.
Jan. 14, 2015—(EP) Extended Search Report—App 10819667.6.
Jul. 10, 2015—(WO) Communication Relating to the Results of the Partial International Search for International App—PCT/US2015/024691.
Jul. 14, 2015—(WO) International Preliminary Report on Patentability—App PCT/US2013/072566.
May 14, 2015—(US) Non Final Rejection—U.S. Appl. No. 13/940,240.
May 25, 2015—(AU) Notice of Acceptance—App 2010297968.
Nov. 2, 2015—(AU) Office Action—App 2013372879.
Nov. 27, 2015—(US) Final Rejection—U.S. Appl. No. 13/940,240.
Sep. 15, 2015 (WO) International Preliminary Report on Patentability—App.—PCT/US2014/027723.
Sep. 15, 2015 (WO) International Preliminary Report on Patentability—App. PCT/US2014/023286.
Sep. 16, 2015 (WO) International Search Report and Written Opinion—App. No. PCT/US2015/024691.
Sep. 4, 2015 (US) Notice of Allowance—U.S. Appl. No. 14/702,755.
M. Al-Suwaiyel et al., "Algorithms for Trie Compaction", ACM Transactions on Database Systems, 9(2): 243-263, Jun. 1984.
M. Christiansen et al., "Using IDDs for Packet Filtering," Technical Report, BRICS, Oct. 2002.
M. Degermark et al., "Small Forwarding Tables for Fast Routing Lookups", Proceedings of ACM SIGCOMM, 4-13, 1997.
Mizuno et al., A New Remote Configurable Firewall System for Home-use Gateways, Jan. 2005. Second IEEE Consumer Communications and Networking Conference, pp. 599-601.
Moore, S, "SBIR Case Study: Centripetal Networks: How CNI Leveraged DHS S&T SBIR Funding to Launch a Successful Cyber Security Company," 2012 Principal Investigators' Meeting, Cyber Security Division, Oct. 10, 2014.
Nichols, et al., "Definition of the Differentiated Services Field (DS Field) in the IPV4 and IPv6 Headers," Network Working Group RFC 2474, Dec. 1998, 20 pages.
O. Paul et al., "A full Bandwidth ATM Firewall", Proceedings of the 6th European Symposium on Research in Computer Security ESORICS'2000, 2000.
P. Warkhede et al., "Fast Packet Classification for Two-Dimensional Conflict-Free Filters", Proceedings of IEEE Infocom, 1434-1443, 2001.
Palo Alto Networks; "Designing A Zero Trust Network With Next-Generation Firewalls"; pp. 1-10; last viewed on Oct. 21, 2012.
Perkins, "IP Encapsulation with IP," Network Working Group RFC 2003, Oct. 1996, 14 pages.
R. Funke et al., "Performance Evaluation of Firewalls in Gigabit-Networks", Proceedings of the Symposium on Performance Evaluation of Computer and Telecommunication Systems, 1999.
R. Rivest, "On Self-Organizing Sequential Search Heuristics", Communications of the ACM, 19(2): 1976.
R.L. Graham et al., "Optimization and Approximation in Deterministic Sequencing and Scheduling: A Survey", Annals of Discrete Mathematics, 5: 287-326, 1979.
Reumann, John; "Adaptive Packet Filters"; IEEE, 2001, Department of Electrical Engineering and Computer Science, The University of Michigan, Ann Arbor, MI.
S,M. Bellovin et al., "Network Firewalls", IEEE Communications Magazine, 50-57, 1994.
S. Goddard et al., "An Unavailability Analysis of Firewall Sandwich Configurations", Proceedings of the 6th IEEE Symposium on High Assurance Systems Engineering, 2001.
S. Suri et al., "Packet Filtering in High Speed Networks", Proceedings of the Symposium on Discrete Algorithms, 969-970, 1999.
Singh, Rajeev et al. "Detecting and Reducing the Denial of Service attacks in WLANs", Dec. 2011, World Congress on Information and Communication TEchnologies, pp. 968-973.
Sourcefire 3D System User Guide, Version 4.10, Mar. 16, 2011, 2123 pages.
Statement RE: Related Application, dated Jul. 24, 2015.
Tarsa et al., "Balancing Trie-Based Policy representations for Network Firewalls," Department of Computer Science, Wake Forest University, pp. 1-6 (2006).
J. Ellermann et al., "Firewalls for ATM Networks", Proceedings of INFOSEC'COM, 1998.
V. Srinivasan et al., "Fast and Scalable Layer Four Switching", Proceedings of ACM SIGCOMM, 191-202, 1998.
V.P. Ranganath, "A Set-Based Approach to Packet Classification", Proceedings of the IASTED International Conference on Parallel and Distributed Computing and Systems, 889-894, 2003.
W.E. Leland et al., "On the Self-Similar Nature of Ethernet Traffic", IEEE Transactions on Networking, 2(1); 15, 1994.
W.E. Smith, "Various Optimizers for Single-Stage Productions", Naval Research Logistics Quarterly, 3: 59-66, 1956.
X. Gan et al., "LSMAC vs. LSNAT: Scalable Cluster-based Web servers", Journal of Networks, Software Tools, and Applications, 3(3): 175-185, 2000.
Ylonen, et al., "The Secure Shell (SSH) Transport Layer Protocol," SSH Communication Security Corp, Newtork Working Group RFC 4253, Jan. 2006, 32 pages.
Mar. 8, 2019 (US) Notice of Allowance and Fees Due—U.S. Appl. No. 16/030,374.
Mar. 18, 2019 (AU) First Examination Report—App. 2016379156.
Apr. 8, 2019 (US) Final Office Action—U.S. Appl. No. 15/413,947.
Jun. 3, 2019 (US) Final Office Action—U.S. Appl. No. 15/614,956.
May 23, 2019 (US) Non-Final Office Action—U.S. Appl. No. 14/745,207.
May 24, 2019 (US) Non-Final Office Action—U.S. Appl. No. 16/111,524.
Jun. 3, 2019 (EP) Communication pursuant to Article 94(3) EPC—Third Examination Report—App. 13765547.8.
Aug. 2, 2018 (US) Notice of Allowance and Fees Due—U.S. Appl. No. 16/030,254.

(56) References Cited

OTHER PUBLICATIONS

Jul. 5, 2019 (EP) Extended European Search Report—App. 19179539.2.
Aug. 2, 2019 (CA) Office Action—App. 2,888,935.
May 8, 2020 (AU) First Examination Report—App. 2016384755.
Apr. 28, 2021—(US) Non-Final Office Action—U.S. Appl. No. 15/382,806.
Valdes, et al., "Probabilistic Alert Correlation," 2001, downloaded from <<http://citeseerx.ist.psu.edu/viewdoc/download?doi=10.1.1.15.3371&rep=rep1&type=pdf>> (Year: 2001), pp. 54-68.
Cisco ACNS Software Configuration Guide for Centrally Managed Deployments, Release 5.5 ("ACNS Guide"), 2006, 944 pages.
Ylonen, et al., "The Secure Shell (SSH) Transport Layer Protocol," SSH Communication Security Corp, Network Working Group RFC 4253, Jan. 2006, 32 pages.
Ingate Firewall/SIParator® SIP Security Best Practice ("Ingate"), published Sep. 2, 2008, 15 pages.
Bradner, "The Internet Standards Process—Revision 3," Network Working Group RFC 2026, Oct. 1996, 36 pages.
J. Frahim, et al., "Cisco ASA: All-in-One Firewall, IPS, and VPN Adaptive Security Appliance," Cisco Press 2006, first printed Oct. 2005, 54 pages.
Golnabi, et al., "Analysis of Firewall Policy Rules Using Data Mining Techniques," 2006 IEEE, pp. 305-315.
C. Fellin, et al., "Preventing Mistraining of Anomaly-Based IDSs through Ensemble Systems," 2014 IEEE 10th World Congress on Services, (2014) pp. 66-69.
Feb. 22, 2022—(EP) Communication with Extended European Search Report—App 21197561.01.
Apr. 15, 2016—(US) Notice of Allowance—U.S. Appl. No. 14/855,374.
Apr. 26, 2016—(US) Office Action—U.S. Appl. No. 14/745,207.
Dec. 5, 2016—(US) Notice of Allowance—U.S. Appl. No. 14/714,207.
Feb. 24, 2016—(AU) Office Action—App 2014228257.
Feb. 25, 2016—(AU) Office Action—App 2014249055.
Feb. 26, 2016—(US) Non Final Office Action—U.S. Appl. No. 14/253,992.
Jan. 11, 2016—(US) Non Final Rejection—U.S. Appl. No. 14/698,560.
Jan. 28, 2016—(WO) International Search Report and Written Opinion—App PCT/US2015/062691.
Jul. 11, 2016—(EP) Office Action—App 14720824.3.
Jul. 20, 2016—(AU) Office Action—App 2013335255.
Jul. 22, 2016—(US) Office Action—U.S. Appl. No. 14/921,718.
Jun. 9, 2016—(WO) International Search Report—PCT/US2016/026339.
Jun. 14, 2016—(US) Office Action—U.S. Appl. No. 14/625,486.
Jun. 16, 2016—(CA) Office Action—App 2,888,935.
May 6, 2016—(US) Office Action—U.S. Appl. No. 14/714,207.
May 13, 2016—(US) Office Action—U.S. Appl. No. 13/940,240.
Nov. 21, 2016—(US) Office Action—U.S. Appl. No. 14/745,207.
Oct. 5, 2016—(US) Notice of Allowance—U.S. Appl. No. 14/698,560.
Oct. 26, 2016—(US) Office Action—U.S. Appl. No. 13/940,240.
Sep. 13, 2016—(CA) Office Action—App 2,902,206.
Sep. 14, 2016—(CA) Office Action—App 2,897,737.
Sep. 26, 2016—(CA) Office Action—App 2,902,158.
Apr. 12, 2017—(US) Office Action—U.S. Appl. No. 14/757,638.
Aug. 15, 2017 (WO) International Preliminary Report on Patentability—App. PCT/US2015/062691.
Aug. 21, 2017 (AU) First Examination Report—App. 2015248067.
Feb. 10, 2017—(US) Notice of Allowance—U.S. Appl. No. 14/625,486.
Feb. 15, 2017—(US) Notice of Allowance—U.S. Appl. No. 14/921,718.
Jul. 20, 2017 (US) Complaint for Patent Infringement—Case No. 2:17-cv-00383-HCN-LRL, Document 1, 38 pages.
Jun. 7, 2017—(US) Office Action—U.S. Appl. No. 14/745,207.
Jun. 7, 2017—(WO) International Search Report and Written Opinion—App PCT/US2016/067111.
Mar. 6, 2017—(WO) International Search Report and Written Opinion—App PCT/US2016/068008.
Nov. 21, 2017 (US) Notice of Allowance—U.S. Appl. No. 14/690,302.
Nov. 3, 2017 (US) Non-Final Office Action—U.S. Appl. No. 15/413,834.
Oct. 17, 2017 (WO) International Preliminary Report on Patentability—App. PCT/US2016/026339.
Sep. 5, 2017 (US) Defendant Ixia's Partial Answer to Complaint for Patent Infringement—Case No. 2:17-cv-00383-HCN-LRL, Document 29, 14 pages.
Sep. 5, 2017 (US) Memorandum in Support of Defendant's Ixia and Keysight Technologies, Inc's Motion to Dismiss for Unpatentability Under 35 U.S.C. § 101—Case No. 2:17-cv-00383-HCM-LRL, Document 21, 29 pages.
Sep. 5, 2017 (US) Request for Judicial Notice in Support of Defendants Ixia and Keysight Technologies, Inc's Motion to Dismiss for Unpatentability under 35 U.S.C. § 101—Case No. 2:17-cv-00383-HCN-LRL, Document 22, 3 pages.
Sep. 29, 2017 (CA) Examination Report—App. 2,772,630.
Apr. 17, 2018 (US) Non-Final Office Action—U.S. Appl. No. 15/610,995.
Aug. 29, 2018 (CA) Office Action—App. 2,888,935.
Aug. 9, 2018 (US) Non-Final Office Action—U.S. Appl. No. 15/413,947.
Dec. 18, 2018 (US) Final Office Action—U.S. Appl. No. 15/610,995.
Jul. 11, 2018 (US) Declaration of Kevin Jeffay, PhD in Support of Petition for Inter Partes Review of U.S. Pat. No. 9,565,213—IPR2018-01386.
Jul. 12, 2018 (US) Petition for Inter Partes Review of U.S. Pat. No. 9,565,213—IPR2018-01386.
Jul. 13, 2018 (US) Notice of Allowance—App. 15/414,117.
Jul. 20, 2018 (US) Declaration of Dr. Stuart Staniford in Support of Petition for Inter Partes Review of U.S. Pat. No. 9,124,552—IPR2018-01436.
Jul. 20, 2018 (US) Declaration of Dr. Stuart Staniford in Support of Petition for Inter Partes Review of U.S. Pat. No. 9,160,713—IPR2018-01437.
Jul. 20, 2018 (US) Petition for Inter Partes Review of U.S. Pat. No. 9,124,552—IPR2018-01436.
Jul. 20, 2018 (US) Petition for Inter Partes Review of U.S. Pat. No. 9,160,713—IPR2018-01437.
Jul. 26, 2018 (US) Declaration of Kevin Jeffay, PhD in Support of First Petition for Inter Partes Review of U.S. Pat. No. 9,137,205—IPR2018-01443.

* cited by examiner

- TCI for Single Captured Packet
  - The filtering rule and associated threat indicator(s) that caused the packet to be captured, as well as the type of the indicator(s)
    - Note: indicator types include IP address, 5-tuple values, FQDN, URI, subdomain, certificate, certificate authority
  - Threat meta-data associated with the filtering rule, which may include the source (threat intelligence provider [TIP]) of the indicator(s), threat type/category (e.g., "phishing malware", "botnet malware", etc.), rule ID, risk score assigned by the TIP to the indicator(s), a name and brief description of the indicator(s), etc.
  - Ingress and egress interface (interface/port), ingress arrival time, direction, size, subnet addresses (if any) associated with the interfaces

- TCI for Captured Micro Flow (and BiDirectional Flow)

Threat context information for a (micro- or bidirectional-) flow may include the same/similar information as for the Single Captured Packet above, as well as flow-level information such as:

- Flow start time, flow stop time, # of packets, packet/payload size (may be averages), packet counts and average sizes per unit time frame
- Correlated segments of the same communications, i.e., when a flow passes through a device such as a network firewall w/Network Address Translation (NAT) that changes the 5-tuple values of the flow, then the segments on both sides of the firewall have different flow characteristics (i.e., different 5-tuple values) but are from the same communication between two endpoints/hosts
- Nesting/encapsulation information for the flow, e.g., an SSL/TLS tunnel may be tunneling an HTTP session, which has characteristic 5-tuple values for its bidirectional flow. Also, the potential threat indicators values that may match the flow at the different levels, e.g., an IP address indicator or 5-tuple indicator for the flow (at network and transport levels/L3-L4); an FQDN/hostname at the HTTP application level/L7; and a certificate fingerprint and signing certificate authority for the TLS tunnel
- TCI for other tunnel types besides SSL/TLS tunnels, e.g., VPN (IPSec) tunnels between gateways, MPLS tunnels, VLAN tags, IPv6-in-IPv4 tunnels, IPv4-in-IPv6 tunnels, etc.

*FIG. 6A*

- TCI for a Metaflow

A metaflow may refer to all the flows between two IP addresses, or between two subnets. For an example of a two-subnet metaflow, consider a cybercriminal operation that occupies a subnet (e.g., the Syrian Electronic Army [SEA]) and that has infiltrated an enterprise. The metaflow between the cybercriminal subnet(s) and the enterprise subnet(s) will be of great interest to the enterprise's cyber-analysts.

Threat context information for a metaflow may include the same/similar information as for the microflow/ bidirectional flow above, as well as metaflow-level information such as:

- The (current) number of (micro-)flows in a metaflow, with traffic statistics for each flow as well as aggregated statistics for the metaflow

- TCI for Networked Applications
  - TCI for HTTP (web)
    - Request method (e.g., GET, PUT, POST, CONNECT, etc.)
    - HTTP header info, including extensions (e.g., XFF)
    - Domain name and URI
    - DNS resolution of the domain name (an IP address) at the time of the HTTP session
    - Web proxy IP address (if any)
  - TCI for DNS
    - DNS standard query information, especially the request info (domain name to resolve) and response info (IP address for the domain name)
    - Correlation/links between query request packet and associated query response packet(s)
    - Reverse DNS information, e.g., IP address in query request, domain name in query response
    - DNSSEC info, including digital signature, public key, chain of trust esp. DNS root zone, etc.
  - TCI for SSL/TLS Tunnels
    - TLS version
    - Certificate and signing certificate authorities, including chain of trust back to root
    - Serial number
    - Digital signature, server public key
    - Server Name Indication (SNI) field value
    - Issuer:Common Name, Subject:Common Name
    - Expiration Date/Valid Dates
    - Unique Identifier

*FIG. 6B*

EFFICIENT PACKET CAPTURE FOR CYBER THREAT ANALYSIS

CROSS REFERENCE TO RELATED APPLICATIONS

This application is a continuation of U.S. patent Ser. No. 15/382,806, filed Dec. 19, 2016, which claims priority to U.S. provisional application Ser. No. 62/274,541, filed Jan. 4, 2016, entitled "EFFICIENT PACKET CAPTURE FOR CYBER THREAT ANALYSIS," which is herein incorporated by reference in its entirety for all purposes.

FIELD

Aspects described herein generally relate to computer hardware and software and network security. In particular, one or more aspects of the disclosure generally relate to computer hardware and software for capturing network packets for cyber threat analysis.

BACKGROUND

Many enterprises (e.g., corporations, partnerships, governments, academic institutions, other organizations, etc.) find it challenging to protect their networks from cyber-attack. Packet capture is a fundamental tool for cyber-analysts who are investigating potential threat incidents. However, conventional packet capture solutions are very inefficient and expensive, both in terms of capital expenditures and operating costs, and are unable to operate at the scale and dynamics of the Internet cyber threat when used for threat analysis. To complicate matters further, most of the captured packets are never used in the threat analysis process.

For example, to detect threat incidents, a typical conventional threat detection system will configure its packet filtering devices, e.g., network firewalls, web proxies, router access control lists (ACLs)), to log all or log a subsample of packet transit events, and store the logs on disk. This configuration will capture threat incidents but will also capture many legitimate (non-threat) events. Typically, threat traffic constitutes only a small percentage of network traffic, so the inefficiency factors are on the order of 10×-100×. That is, the fidelity of threat incidents in the log files is very low. Furthermore, the raw logs do not discriminate between threat incidents and legitimate events. To identify threat incidents in the logs, cyber-analysts typically download recent threat intelligence (often called "Indicators-of-Compromise (IoCs)", or "threat indicators", or "indicators" within proper context) from their preferred threat intelligence provider(s), and then search the logs for matches with the indicators. Each search is usually performed against one indicator at a time. Given that threat intelligence providers typically supply 10,000 to 1,000,000 indicators per day, it is not a surprise that the average times-to-discovery of network attacks are measured in weeks or months (if they are ever discovered).

Conventional packet capture solutions have similar inefficiencies for threat management, and for similar reasons. The motivation for capturing packets is that the cyber-analyst who is investigating threat incidents may want to view the contents of the packets that generated a particular threat incident log. Because conventional solutions cannot readily discriminate between threat and legitimate packets when they are in transit, the default behavior is to capture all, or substantially all, packets. Capturing or storing all packets ensures that when a cyber-analyst wants to investigate a threat incident by examining the associated packets' contents, the associated packets will be in store. However the cost is high: As above with packet logs, given that threat communications typically compose only a small percentage of network traffic, the inefficiencies are very large, with 10×-100× more packets stored than will be needed for threat analysis.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, methods, and techniques for efficiently detecting threat incidents for cyber threat analysis. In particular, aspects described herein provide a purpose-built packet filter configured to efficiently detect threat incidents as the associated packets cross the network's boundary/security perimeter. Aspects of the disclosure described in greater detail below may be used to aggregate threat indicators supplied by many different threat intelligence providers, and compare these threat indicators to each packet that is transiting the network boundary/security perimeter. Additional aspects of the disclosure may be used to integrate threat filtering, threat incident logging, and threat packet capture to facilitate filtering, logging, and capture using the same threat indicators at the same time at the same network location. Other features may be used to capture bidirectional flows if or when most of the packets in the flow do not match an indicator rule. Features described in greater detail below may be used to include threat context information in packet capture files for cyber threat analysis.

In accordance with one or more embodiments, a method, for using threat intelligence to effect packet capture in an enterprise threat management system, may comprise receiving, by a computing device, one or more threat indicators from one or more threat intelligence providers, wherein the computing device is located at a boundary between a protected network associated with the enterprise and an unprotected network; in response to receiving the threat indicators, combining the threat indicators based on a source address and port, a destination address and port, and a protocol type ("5-tuple") associated with the threat indicators; generating one or more packet capture and packet filtering rules based on the combined threat indicators; and filtering, by the computing device, on a packet-by-packet basis, at least one packet based on at least one of the one or more capture and packet filtering rules. In other embodiments, the combining of the threat indicators may be based on a hostname or a fully-qualified domain name (FQDN). In yet other embodiments, the combining of the threat indicators may be based on a uniform resource identifier (URI).

In some embodiments, the method may further comprise: determining whether to log the at least one packet based on the at least one of the one or more capture and packet filtering rules; and determining whether to capture the at least one packet based on the at least one of the one or more capture and packet filtering rules. In other embodiments, wherein the filtering of the at least one packet, the determining whether to log the at least one packet, and the determining whether to capture the at least one packet is performed simultaneously.

In other embodiments, the method wherein the determining whether to capture the at least one packet based on the at least one of the one or more capture and packet filtering rules, comprises: capturing both incoming and outgoing packets comprised by a bidirectional communication flow indicated by the at least one packet.

Alternatively, in yet other embodiments, a method may comprise generating, by a computing device, a packet capture file comprising raw packet content and threat context information; wherein the threat context information comprises a filtering rule and associated threat indicator that caused the packet to be captured.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 6A-6B depicts an embodiment of threat context information in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards systems, methods, and techniques for efficiently detecting threat incidents for cyber threat analysis. In particular, aspects described herein provide a purpose-built packet filter configured to efficiently detect threat incidents as the associated packets cross the network's boundary/security perimeter. Features described in greater detail below may be used to aggregate threat indicators supplied by many different threat intelligence providers, and compare these threat indicators to each packet that is transiting the network boundary/security perimeter. Additional aspects of the disclosure may be used to integrate threat filtering, threat incident logging, and threat packet capture to facilitate filtering, logging, and capture using the same threat indicators at the same time at the same network location. Other features may be used to capture bidirectional flows if or when most of the packets in the flow do not match an indicator rule. Features described in greater detail below may be used to include threat context information in packet capture files for cyber threat analysis.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

End-to-End Threat Management System

Figure 1:
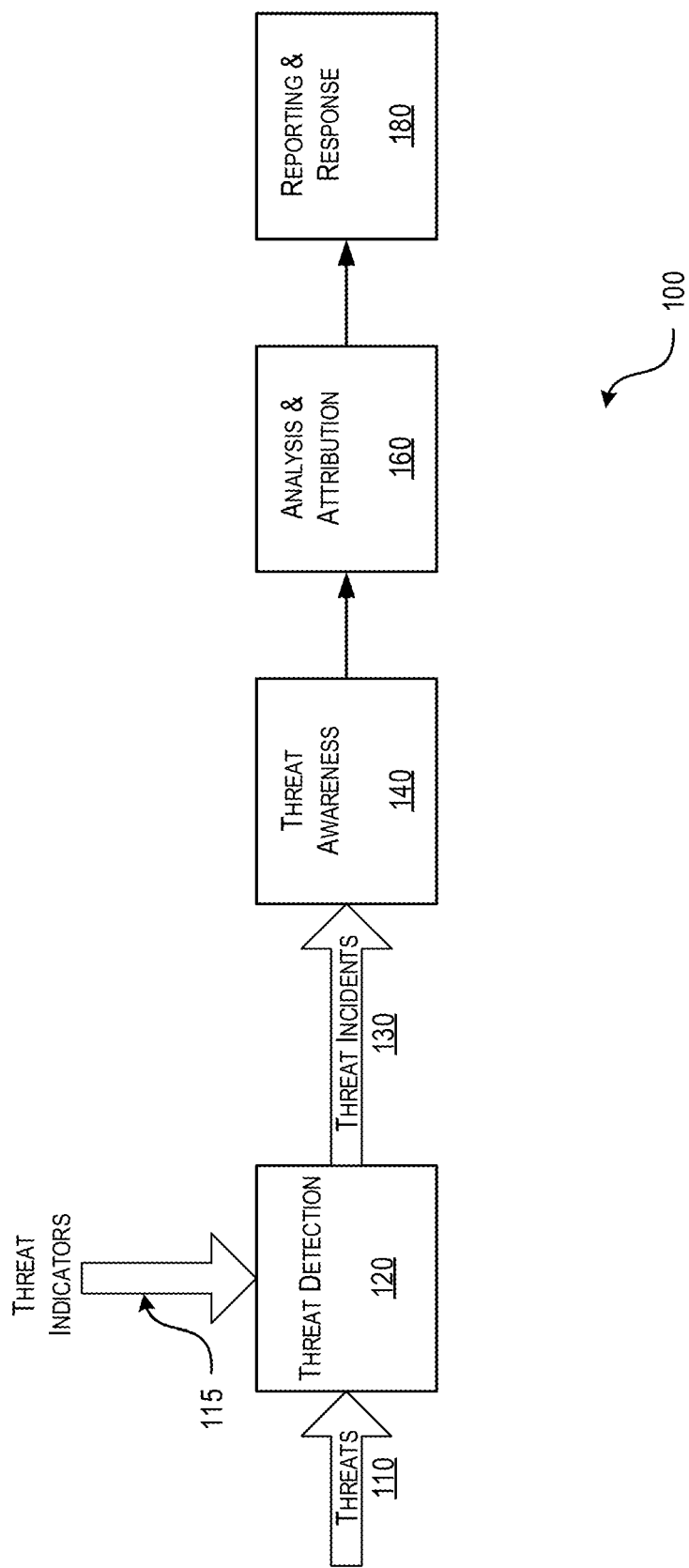
FIG. 1 depicts an illustrative high-level functional diagram of an end-to-end threat management system that may be used in accordance with one or more illustrative aspects described herein.

FIG. 1 illustrates one example of an end-to-end threat management system 100. The input to the threat management system 100 may consist of threats 110, which may be in the form of IP protocol or other packets comprising the various network communication flows crossing the boundaries of an enterprise network. In the network, these threat packets 110 may be mixed with non-threat packets generated by legitimate communications.

The threat detection module 120 may be configured to identify, or discriminate, the threat packets 110 from among the legitimate packets. Once identified, the threat detection module 120 may generate or create threat incidents 130 based on the identified threat packets 110. For example, the threat detection module 120 may compute logs of the threat packets 110. Threat incidents 130 are the input into the next functional stage, the threat awareness module 140.

Note that packet logs produced by packet filtering devices typically include Layer 2 to Layer 7 header information and environmental/context information, such as time-of-day, ingress/egress interface name, etc., but do not include the entire raw packet. The raw packet is typically not included in logs for several reasons, including space and processing resource requirements, and because the individual logs of the packets that compose a flow are often compressed into a single log of the associated flow. The flow is typically at the level of abstraction at which cyber-analysts and network administrators perform their monitoring and analysis functions. Thus, in network traffic monitoring and analysis, packet capture is generally considered to be a function that is separate and distinct from packet or flow logging.

The threat detection module 120 may be further configured to aggregate threat indicators 115 from one or more threat intelligence providers and to use these threat indicators 115 to identify threat incidents 130. For example, a type of threat indicator 115 may comprise one or more network addresses indicating one or more websites that are known to be operated by cyber criminals or other malicious actors, or that display characteristics and behavior indicative of malicious operation. Communications between a known malicious website and a host attached to an enterprise network may be a component of an attack on the enterprise network. The threat detection module 120 may compare and match the network addresses used in the network communications with the threat indicators 115 provided by the threat intelligence providers. In some embodiments, the network address may comprise an Internet Protocol (IP) address. In other embodiments, the network address may comprise a uniform resource identifier (URI) address. In yet other embodiments, the network address may comprise hostnames or fully-qualified domain names (FQDN). Other types of threat indicators 115 may comprise identification of a X.509 certificate or of a certificate authority. An example of such a threat detection module 120 is the RULEGATE packet filter appliance offered for sale by Centripetal Networks, Inc., of Leesburg, VA. See U.S. Pat. No. 9,137,205, entitled "Methods and Systems for Protecting a Secured Network," hereby incorporated by reference, for additional details of a packet security gateway such as the RULEGATE packet filter appliance.

The threat awareness module 140 may be configured to provide cyber-analysts with situational awareness of the threats/potential attacks against the network. The threat awareness module 140 may aggregate packet logs and threat incidents 130 into flow logs, and may also perform flow correlations and risk scoring. The threat awareness module 140 may associate flows from both sides of a flow-transforming device, such as firewalls or web proxies, which are segments of the same communication. A flow, or a microflow, may refer to a collection of packets with the same "5-tuple" values (i.e., source address and port, a destination address and port, and a protocol type) generated by the same (single) event/action at the sourcing host. In some cases, the bidirectional flow may be identified as the flow, i.e., the packets flowing between the source and destination in both directions. The packets composing a bidirectional flow may have the same 5-tuple values, but may have the source and destination field values transposed depending on the direction of the packet (e.g., from client-to-server, or from server-to-client).

The threat awareness module 140 may be further configured to compute a threat risk score for a threat incident 130. A higher computed risk score may indicate a higher likelihood that the corresponding threat incident 130 is an actual attack. After processing, the threat awareness module 140 may present the threat incidents 130 to a cyber-analyst or other approved user, and may also provide situational awareness of the identified threats 110, or potential attacks, against the network. An example of such a threat awareness module is the QUICKTHREAT application offered for sale by Centripetal Networks, Inc., of Leesburg, VA. See U.S. patent application Ser. No. 14/690,302, entitled "Rule-Based Network-Threat Detection," hereby incorporated by reference, for additional details.

The analysis & attribution module 160 may determine if a threat incident 130 is an actual attack, and if so, may attribute the attack to one or more malicious actors. The analysis & attribution module 160 may fuse multiple sources of data associated with the threat incident 130 to determine if the threat incident 130 is an actual attack. The multiple sources of data being fused may include the contents of packets associated with the threat incidents, threat intelligence reports, threat incident context, correlations, and the like. The functions provided by the analysis & attribution module 160 may be performed using software such as an expert system or other types of artificial intelligence. In the alternative, a human cyber-analyst may perform such functions using conventional techniques. In another alternative, the expert system or other type of artificial intelligence may assist a human cyber-analyst to perform the analysis & attribution functions.

The report & response module 180 may be configured to report on attacks and their effects, and specify response actions, if any. Response actions may include blocking communications with attack sites, removing malware-infected hosts, or otherwise compromised hosts, from the protected network, and sweeping malware-infected hosts that were victims of attacks or unwitting participants/abettors in attacks. The functions provided by the report & response module 180 may be performed using software such as an expert system or other types of artificial intelligence. In some embodiments, a human cyber-analyst may perform such functions using conventional techniques. In other embodiments, the expert system or other type of artificial intelligence may assist a human cyber-analyst to perform the analysis & attribution functions. In yet other embodiments, the enterprise may subscribe to a service which may produce attack reports with recommended response actions. An example of such a service is the Network Threat Assessment and Monitoring service offered by Centripetal Networks, Inc., of Leesburg, VA.

FIG. 1 illustrates just one example of a system architecture that may be used, and those of skill in the art will appreciate that the specific system architecture and computing devices used may vary, and are secondary to the functionality that they provide, as further described herein. For example, the functionality provided by the threat detection module 120, threat awareness module 140, analysis & attribution module 160, and the reporting & response module 180 may be combined or separated into a different combination of modules. Similarly, the functionality provided by these modules may be implemented using a combination of computing hardware and software components, and humans-in-the-loop (e.g., cyber-analysts). For example, these modules may be executed on a single computing device or on multiple computing devices at one site or distributed across multiple sites and interconnected by a communication network.

Figure 2:
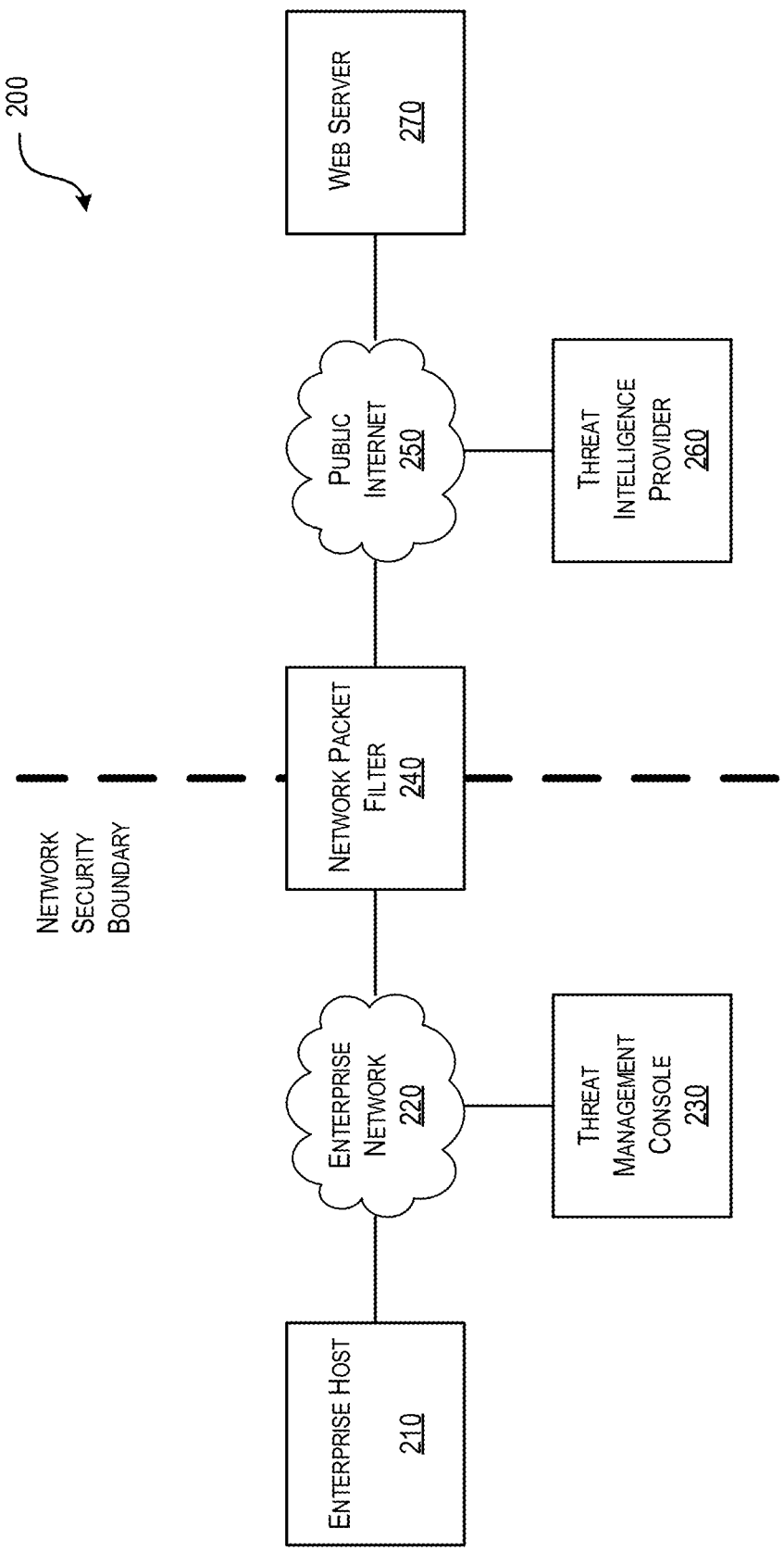
FIG. 2 depicts an illustrative system architecture that may be used in accordance with one or more illustrative aspects described herein.

FIG. 2 depicts an illustrative system architecture which may be used for packet capture for cyber threat analysis in accordance with one or more example embodiments. As seen in FIG. 2, a network packet filter 240 may be placed at a network security boundary between the protected enterprise network 220 and the public Internet 250 in order to have visibility of all outgoing and incoming traffic between the enterprise (protected) network 220 and the public (unprotected) Internet 250. In one embodiment, the network packet filter 240 may be placed at or near an Internet access link provided by the enterprise's Internet service provider (ISP.) The network packet filter 240 may provide functionality similar to the functionality provided by the threat detection module 120 described above in reference to FIG. 1. The network packet filter 240 may be configured to filter, log, and capture packets that match filtering rules that have been generated from threat indicators 115 provided by one or more threat intelligence providers 260. In some embodiments, the network packet filter 240 may combine threat indicators 115 based on the "5-tuple" values (i.e., the protocol type, source address and port, destination address and port) associated with the threat indicators 115. In other embodiments, the network packet filter 240 may combine the threat indicators based on a hostname or a fully-qualified domain name (FQDN) comprised by the threat indicators 115. In yet other embodiments, the network packet filter 240 may combine the threat indicators based on a uniform resource identifier (URI) associated with the threat indicators 115. The network packet filter 240 may support rules written using the extended rule syntax described in further detail in the next section below. See U.S. Pat. No. 9,137,205, entitled "Methods and Systems for Protecting a Secured Network," hereby incorporated by reference, for additional details of a packet security gateway, e.g., a network packet filter.

Referring to FIG. 2, the threat intelligence provider 260 may provide a threat intelligence subscription service which may be configured to deliver threat indicators to the network packet filter 240. The network packet filter 240 may be subscribed to one or more threat intelligence providers 260. An enterprise may find it advantageous to subscribe to multiple threat intelligence providers 260 because providers often specialize in certain types of threat intelligence. For example, one threat intelligence provider may focus on supplying intelligence and indicators for botnet command & control (C&C) servers, whereas another provider may focus on phishing web sites/URLs, whereas yet another provider may focus on malware delivered through advertising feeds. However, providers may prefer to be a sole source for their subscribers, so they may broaden their coverage by including other types of intelligence/indicators, possibly gleaned from open sources available to all providers. As a result, there may be a significant probability that multiple providers may provide overlapping threat indicators. The network packet filter 240 may combine multiple threat indicators into fewer indicators or into a different set of threat indicators in order to reduce the number of filtering rules and reduce the potential for duplicate rules, inconsistent rules, or gaps in rule coverage.

A threat management console 230 may be a computing device configured to host one or more threat management applications and may be operated by an enterprise cyber-analyst and may assist the cyber-analyst in managing and executing the functionality described above in reference to FIG. 1 (see FIG. 1, elements 120, 140, and 160). The threat management console 230 may be configured to control and monitor operation of the network packet filter 240, as well as, to receive threat incidents, packet logs, and other situational awareness from the network packet filter 240. The threat management console 230 may also be configured to control and monitor operation of the threat intelligence information services supplied by threat intelligence providers 260. The threat management console 230 may be further configured to manage the rules and threat intelligence used by the network packet filter 240 to filter and capture packets. The threat management console 230 may also manage threat incidents, threat awareness, and threat analysis and reporting as described above in reference to threat awareness module 140 and to analysis & attribution module 160. The threat management console 230 may be hosted on a single server or on a multiple-server or virtualization system (e.g., a remote access or cloud system) configured to provide virtual machines for the threat management applications. In some embodiments, the threat management applications may be implemented as web applications and accessed through a web browser.

Referring to FIG. 2, the computing environment 200 may include a web server 270. In some embodiments, the web server 270 may be operated by a cybercriminal group, and may be hosted at a commercial hosting service.

Computing environment 200 also may include one or more enterprise hosts 210. Enterprise hosts 210 may be any type of computing device capable of receiving and processing input via one or more user interfaces, providing output via one or more user interfaces and communicating input, output, and/or other information to and/or from one or more other computing devices. For example, enterprise host 210 may be a server computer, a desktop computer, laptop computer, tablet computer, smart phone, or the like. One or more enterprise hosts 210 may become infected by malware beaconing out or exfiltrating to web server 270, or may be operated by an enterprise user that may be knowingly or unknowingly communicating with web server 270.

Computing environment 200 also may include one or more networks, which may interconnect the network packet filter 240, the threat management console 230, and the enterprise hosts 210. For example, computing environment 200 may include enterprise network 220, which may include one or more private networks operated by and/or associated with the enterprise and which may include one or more local area networks, wide area networks, virtual private networks, etc.

FIG. 2 illustrates just one example of a system architecture that may be used, and those of skill in the art will appreciate that the specific system architecture and computing devices used may vary, and are secondary to the functionality that they provide, as further described herein. For example, the services provided by the network packet filter 240 may be executed on a single computing device or on multiple computing devices at one site or distributed across multiple sites and interconnected by a communication network.

Figure 3:
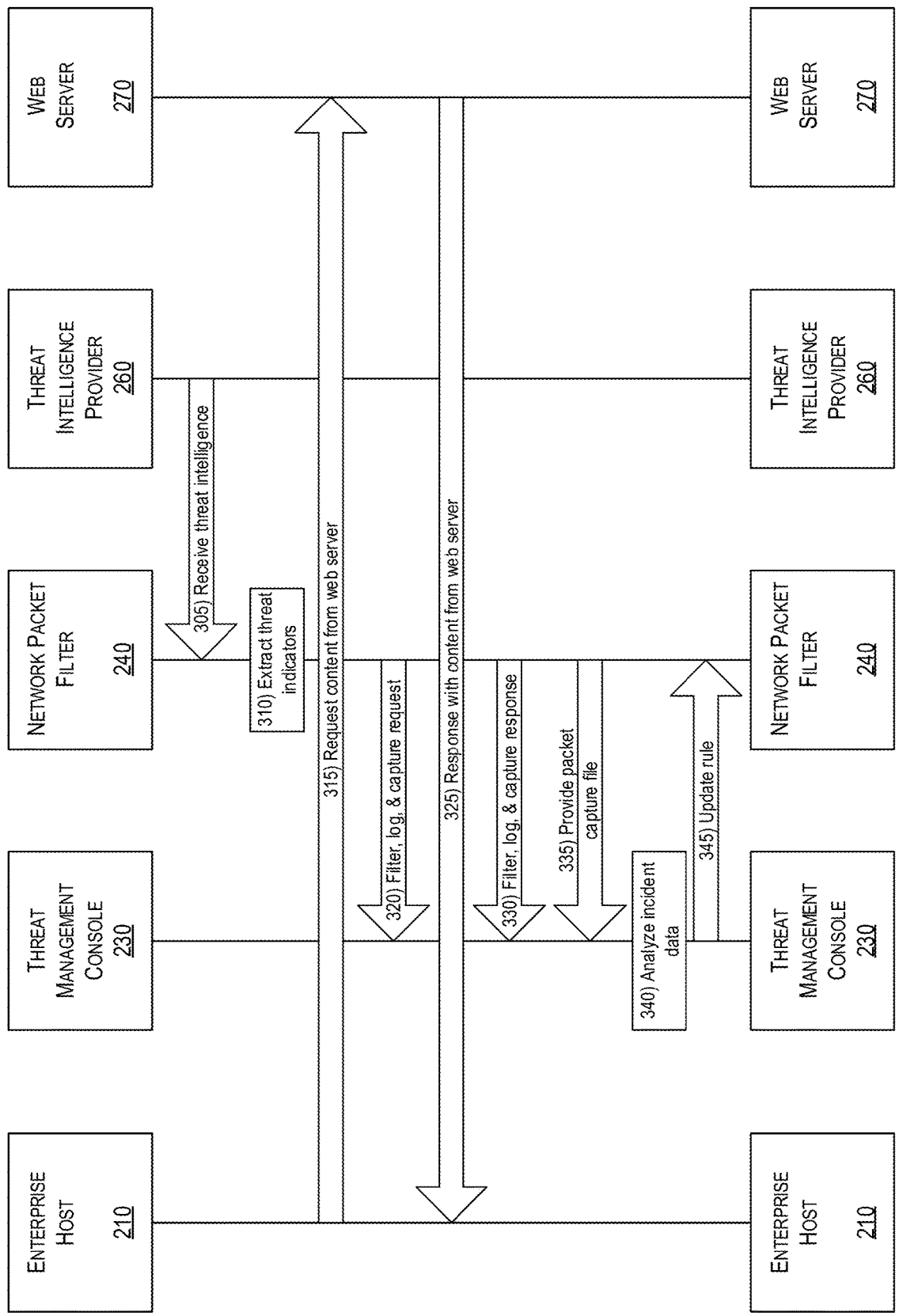
FIG. 3 depicts an example event sequence for providing a method of packet filtering and capture for cyber threat analysis in accordance with one or more illustrative aspects described herein.

FIG. 3 depicts an example event sequence that illustrates a method of packet filtering and capture for cyber threat analysis. As seen in FIG. 3, one or more steps of the depicted example event sequence and other similar examples described herein may be performed in a computing environment such as the system illustrated in FIG. 2, as well as other systems having different architectures. In other embodiments, the method illustrated in FIG. 3 and/or one or more steps thereof may be embodied in a computer-readable medium, such as a non-transitory computer readable memory.

In step 305, the network packet filter 240 may receive threat intelligence feeds from one or more threat intelligence providers 260. The network packet filter 240 may aggregate all the received threat intelligence feeds from the one or more threat intelligence providers 260 into a single threat intelligence feed. At step 310, the network packet filter 240 may extract the threat indicators from the threat intelligence feeds. The threat indicators may comprise network addresses, X.509 certificates, or certificate authorities. The network packet filter 240 may be configured to create a packet filtering rule for each threat indicator and include the newly created filtering rule in the filter's active network security policy. In some embodiments, the packet filtering rule may include a "log" directive and a "pcap" directive. The "log" directive may cause the network packet filter 240 to create a log of a packet, a threat incident, that matches the associated rule. The "pcap" directive may cause the network packet filter 240 to create a copy of a packet matching the associated rule and capture/store the packet on local storage in the network packet filter 240.

In step 315, the enterprise host 210 may request to retrieve content from web server 270. In some embodiments, the content request may originate from a web browser or a malware application executing within the enterprise host 210. In other embodiments, the request may comprise a HTTP GET request. For example, HTTP "GET www.risky-site.com" may be used to retrieve the default resource (e.g., the home page) from the web server associated with domain name www.risky-site.com.

In step 320, the network packet filter 240 may filter the content request from the enterprise host 210 as it is transmitted through the network packet filter 240 to its destination, the web server 270. The network packet filter 240 may be configured to compare the request packet with all of the rules in its active network security policy. In some embodiments, the request packet may match a rule such as:

pass in log pcap quick from any to any host www.risky-site.com

The "log" directive in the rule for the example embodiment may cause the network packet filter 240 to create a log of the request packet, or threat incident, and store it on a local disk in the log file. In some embodiments, the log data may be formatted using the Common Event Format (CEF) (publicly-available open-source format). The network packet filter 240 may also push the threat incident to the threat management console 230 to alert a cyber-analyst to the threat incident. The threat incident may be assigned a high risk score based on the current risk scoring factors and criteria. See U.S. patent application Ser. No. 14/690,302, entitled "Rule-Based Network-Threat Detection," hereby incorporated by reference, for additional details of risk scoring factors and criteria. The "pcap" directive in the rule for the example embodiment may cause the network packet filter 240 to store a copy of the request packet in a file, using libpcap format (publicly-available open-source library) or pcap-ng format (publicly-available open-source library), on a local disk. The "pcap" directive may also cause the network packet filter 240 to collect threat context information associated with the requested packet and store it with the copy of the request packet.

In step 325, the web server 270 may return the requested content in response to the request sent in step 315. The one or more packets comprising the response may be routed through the network packet filter 240 to the enterprise host 210. In step 330, the network packet filter 240 may filter, log, and capture the response from the web server 270.

In step 335, the threat management console 230 may obtain, from the network packet filter 240, a file comprising the one or more packets associated with the threat incident. In some embodiments, the requested file may be formatted in standard libpcap or pcap-ng formats.

In step 340, the threat management console 230 may present the threat incidents using the available dashboard instruments. See U.S. patent application Ser. No. 14/690,302, entitled "Rule-Based Network-Threat Detection," hereby incorporated by reference, for additional details of dashboard instruments. The threat management console 230 may be configured to present the threat incident associated with the request in step 315 at or near the top of a dashboard instrument if the threat incident has a high risk score. The threat management console 230 may prioritize high risk threat incidents and alert the cyber-analyst to the most serious threats or potential attacks. The threat management console 230 may include packet analyzer tools to review the full content of the packets associated with the threat incident. The threat management console 230 may be further configured to fuse and collate the threat intelligence data, threat incident data, packet content data, threat context data, and additional situational awareness information.

In step 345, the threat management console 230 may update the packet filtering rules associated with the threat incident based on the results of the threat incident investigation. For example, the threat management console 230 may request the network packet filter 240 to block packets associated with the threat incident. In response, the network packet filter 240 may update one or more rules and update its active security policy.

Advantageously, and as illustrated in greater detail above, the network packet filter 240 may use threat intelligence to select only threat packets that are crossing the security boundary for logging and capture functions. In addition, integrating packet logging and packet capture with each packet filtering rule may improve threat-packet-capture efficiency by using the same threat indicators at the same location at the same time. Under typical enterprise network conditions, this results in large increases in efficiency for space and computing resources. Furthermore, it also reduces the time needed for the cyber-analyst to determine the type and nature of a threat, while improving the quality of the determination, e.g., to reduce false positives and false negatives.

Packet Capture Extensions to Packet Filtering Rules

A de facto standard syntax for filtering rules used by many packet filtering devices is the syntax for rules in PF and/or IPFilter, which are packet filtering/firewall software. PF was developed for OpenBSD in 2001 as a replacement for IPFilter (which also uses a similar rule syntax). However, the PF rule syntax does not include any directives for capturing packets. As described above, the network packet filter 240 may support packet capture by extending the PF rule syntax to include directives for capturing packets.

The PF rule syntax supports filtering on "5-tuple" field values (i.e., the protocol type, source address and port, destination address and port). The PF rule syntax extensions described herein may also support filtering on 5-tuple field values but in addition may also support filtering based on host domain names and based on uniform resource identifiers (URI).

The PF rule syntax may also be extended to include a packet capture directive that may cause the packet capture filter 240 to store a copy of any rule-matching packet to local storage. The packet capture directive may be named "pcap". In some embodiments, the packet capture file may be formatted using either libpcap or pcap-ng formats. For example, the following packet filtering rule:

pass in log pcap quick from any to any host www.risky-site.com may detect and capture the packet containing the "GET www.risky-site.com" request. However, it will not detect (or capture) the subsequent packets in the bidirectional flow, because none of those packets contain the value www.risky-site.com in any packet header field.

The PF rule syntax may be further extended to include a flow capture directive that may cause the network packet filter 240 to store a copy of any rule-matching packet to local storage and to also store any subsequent packets in the bidirectional flow between the web client and the web server. The flow capture directive may cause the capture of all the packets in the forward flow (client to server) and in the reverse flow (server to client). The flow capture directive may support TCP/IP packet-based protocols that comprise bidirectional flows (e.g., HTTP, SSH, SMTP, etc.) The flow capture directive may be named "fcap". In some embodiments, the flow capture file may be formatted using either libpcap or pcap-ng formats. For example, the following packet filtering rule:

pass in log fcap quick from any to any host www.risky-site.com has a "pass" action, which allows any matching packets to continue towards their destinations, and which enables capture of the subsequent bidirectional flows. However, if the action were "block", then the fcap directive should not be used, instead the pcap directive should be used, as follows:

blocked in log pcap quick from any to any host www.risky-site.com

The pcap directive may be preferable because the original GET command would be blocked from reaching its destination and thus there may not be subsequent flow packets in response.

Threat Context Information for Analysis of Captured Packets

The network packet filter 240 may include threat context information (TCI), as shown in FIGS. 6A-6B, in the packet capture or flow capture files generated in response to the pcap and fcap directives, respectively. The threat management console 230 may use the threat context information included in the packet capture files in analysis of threat incidents. The threat management console 230 may be further configured to present the threat context information to the cyber-analyst reviewing and analyzing the threat incidents.

Figure 4:
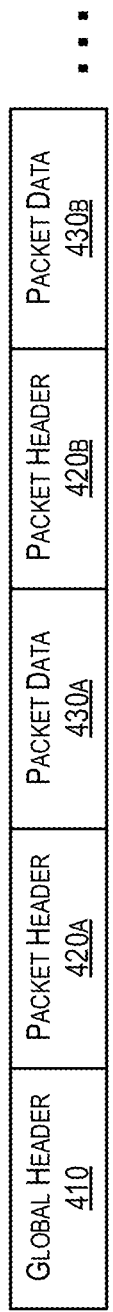
FIG. 4 depicts an illustrative file structure that may be used in accordance with one or more illustrative aspects described herein.

The threat context information in the packet capture files may be stored in either libpcap or pcap-ng compliant formats. The libpcap file structure, as shown in FIG. 4, comprises one global header block 410, one or more packet header blocks 420A-N, and one or more packet data blocks 430A-N. Since the libpcap file structure does not currently support an extension mechanism by which to add the threat context information, the network packet filter 240 may be configured to synthesize packets, or create "artificial" packets, in conformance with the IEEE 802a-2003 standard "Amendment 1: Ethertypes for Prototype and Vendor-Specific Protocol Development". The synthesized packets may be in the form of Ethernet frames, with payloads containing the threat context information in the packet data blocks 430. Thus, IEEE 802a-2003 compliant devices and applications may be able to access and manipulate the threat context information as they would other packet data. Compliant devices and applications may also forward the threat context information packets through an Ethernet-switched network. For example, threat context information may be streamed to network-attached storage devices, e.g., storage array in a data center.

Figure 5:
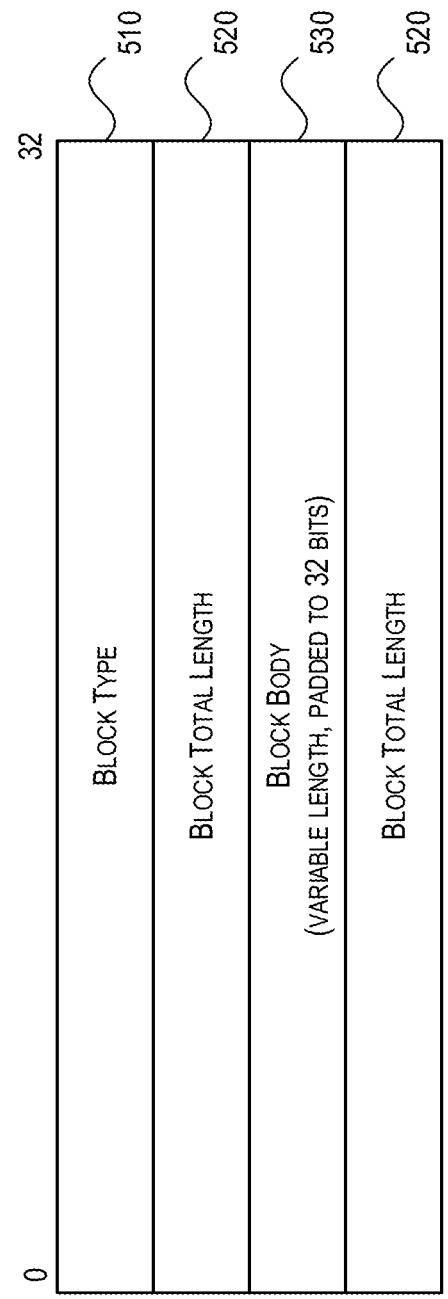
FIG. 5 depicts an illustrative file structure that may be used in accordance with one or more illustrative aspects described herein.

The pcap-ng file format, as shown in FIG. 5, comprises a block type 510, a block total length 520, and a block body 530 of variable length. A pcap-ng-formatted file comprises a collection of these blocks. The block type 510 field may be used to indicate the type of content in the block body 530. A pcap-ng-formatted file may comprise one of several optional or experimental block types. Among the optional block types, there are two designated for capturing packets: Simple Packet Block type and Enhanced Packet Block type. However, neither of these two optional block types may be designated for storing threat context information. The network packet filter 240 may be configured to create an experimental block type which comprises the threat context information.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

What is claimed is:

1. A computing device located at a boundary between a protected network and an unprotected network external to the protected network, the computing device comprising:
   one or more processors; and
   memory storing instructions that, when executed by the one or more processors, cause the computing device to:
      receive, from a first network threat intelligence provider external to the protected network, one or more of:
         a domain name, or
         a uniform resource identifier;
      automatically generate, based on the domain name or the uniform resource identifier, one or more packet filtering rules by:
         generating a first packet filtering rule configured to filter packets matching the domain name or the uniform resource identifier; and
         assigning a flow capture directive to the first packet filtering rule, wherein the flow capture directive is configured to cause the computing device to:
            cause storage of one or more packets matching the domain name or the uniform resource identifier; and
            cause storage, based on a five-tuple field value corresponding to the one or more packets matching the domain name or the uniform resource identifier, of a bidirectional flow of packets subsequent to the one or more packets matching the domain name or the uniform resource identifier;
      filter, based on the first packet filtering rule, a plurality of packets:
      determine, based on the filtered plurality of packets, one or more first packets, received by the computing device and corresponding to a first packet flow, that match the domain name of the uniform resource identifier;
      based on determining that the one or more first packets match the domain name or the uniform resource identifier of the first packet filtering rule:
         determine a first 5-tuple of the determined one or more first packets; and
         capture, based on the flow capture directive of the first packet filtering rule and based on the first 5-tuple of the determined one or more first packets matching the five-tuple field value corresponding to the domain name or the uniform resource identifier, the one or more first packets;
      after capturing the one or more first packets:
         determine a second 5-tuple of one or more subsequent packets; and
         capture, based on the flow capture directive of the first packet filtering rule and based on determining that the second 5-tuple of the one or more subsequent packets corresponds to the first 5-tuple, the one or more subsequent packets of the first packet flow; and
      generate, for the captured one or more subsequent packets of the first packet flow, a packet capture file comprising:
         raw packet content of the captured one or more first packets and the one or more subsequent packets, and
         threat context information comprising an indication of the first packet filtering rule.

2. The computing device of claim 1, wherein the determining that the second 5-tuple of the one or more subsequent packets corresponds to the first 5-tuple comprises determining one or more of:
    a source value of the first 5-tuple is a destination value of the second 5-tuple, or
    the second 5-tuple indicates that the one or more first packets are traveling in an opposite direction compared to the one or more subsequent packets.

3. The computing device of claim 1, wherein the flow capture directive is configured to cause storage of all packets transiting in either direction of the bidirectional flow.

4. The computing device of claim 1, wherein the instructions, when executed by the one or more processors, cause the computing device to:
    receive, from a second network threat intelligence provider, a second domain name or uniform resource identifier; and
    generate a third network threat indicator by combining a first portion of the domain name or the uniform resource identifier and a second portion of the second domain name or uniform resource identifier based on common characteristics of the domain name or the uniform resource identifier and the second domain name or uniform resource identifier, wherein generating the first packet filtering rule configured to filter packets matching the domain name or the uniform resource identifier comprises generating the first packet filtering rule such that the first packet filtering rule is configured to filter packets associated with the third network threat indicator.

5. The computing device of claim 4, wherein the common characteristics comprise one or more of:
    a common source address,
    a common source port,
    a common destination address,
    a common destination port,
    a common protocol type,
    a common uniform resource identifier (URI), or
    a common domain name.

6. The computing device of claim 1, wherein the instructions, when executed by the one or more processors, cause the computing device to:
    determine whether to log the one or more subsequent packets based on the first packet filtering rule.

7. The computing device of claim 1, wherein the first packet filtering rule permits packets matching the domain name or the uniform resource identifier to cross the boundary between the protected network and the unprotected network.

8. The computing device of claim 1, wherein the assigning the flow capture directive to the first packet filtering rule is based on determining that the first packet filtering rule is configured to permit packets matching the domain name or the uniform resource identifier to cross the boundary between the protected network and the unprotected network.

9. The computing device of claim 1, wherein the assigning the flow capture directive to the first packet filtering rule is based on an indication, from the first network threat intelligence provider, that traffic matching the domain name or the uniform resource identifier should be permitted to cross the boundary between the protected network and the unprotected network.

10. A method comprising:
    receiving, by a computing device located at a boundary between a protected network and an unprotected network external to the protected network and from a first network threat intelligence provider external to the protected network, one or more of:
    a domain name, or
    a uniform resource identifier;
    automatically generating, based on the domain name or the uniform resource identifier, one or more packet filtering rules by:
        generating a first packet filtering rule configured to filter packets matching the domain name or the uniform resource identifier; and
        assigning a flow capture directive to the first packet filtering rule, wherein the flow capture directive is configured to cause the computing device to:
            cause storage of one or more packets matching the domain name or the uniform resource identifier; and
            cause storage, based on a five-tuple field value corresponding to the one or more packets matching the domain name or the uniform resource identifier, of a bidirectional flow of packets subsequent to the one or more packets matching the domain name or the uniform resource identifier;
    filtering, by the computing device and based on the first packet filtering rule, a plurality of packets;
    determining, based on the filtered plurality of packets, one or more first packets, received by the computing device and corresponding to a first packet flow, that match the domain name or the uniform resource identifier;
    based on determining that the one or more first packets match the domain name or the uniform resource identifier of the first packet filtering rule:
        determining a first 5-tuple of the determined one or more first packets; and
        capturing, by the computing device and based on the flow capture directive of the first packet filtering rule and based on the first 5-tuple of the determined one or more first packets matching the five-tuple field value corresponding to the domain name or the uniform resource identifier, the one or more first packets;
    after capturing the one or more first packets:
        determine a second 5-tuple of one or more subsequent packets; and
        capture, based on the flow capture directive of the first packet filtering rule and based on determining that the second 5-tuple of the one or more subsequent packets corresponds to the first 5-tuple, the one or more subsequent packets of the first packet flow; and
    generating, by the computing device and for the captured one or more subsequent packets of the first packet flow, a packet capture file comprising:
        raw packet content of the captured one or more first packets and the one or more subsequent packets, and
        threat context information comprising an indication of the first packet filtering rule.

11. The method of claim 10, wherein the determining that the second 5-tuple of the one or more subsequent packets corresponds to the first 5-tuple comprises determining one or more of:
    a source value of the first 5-tuple is a destination value of the second 5-tuple, or
    the second 5-tuple indicates that the one or more first packets are traveling in an opposite direction compared to the one or more subsequent packets.

12. The method of claim 10, wherein the flow capture directive is configured to cause storage of all packets transiting in either direction of the bidirectional flow.

13. The method of claim 10, further comprising:
receiving, by the computing device and from a second network threat intelligence provider, a second domain name or uniform resource identifier; and
generating a third network threat indicator by combining a first portion of the domain name or the uniform resource identifier and a second portion of the second domain name or uniform resource identifier based on common characteristics of the domain name or the uniform resource identifier and the second domain name or uniform resource identifier, wherein generating the first packet filtering rule configured to filter packets matching the domain name or the uniform resource identifier comprises generating the first packet filtering rule such that the first packet filtering rule is configured to filter packets associated with the third network threat indicator.

14. The method of claim 13, wherein the common characteristics comprise one or more of:
a common source address,
a common source port,
a common destination address,
a common destination port,
a common protocol type,
a common uniform resource identifier (URI), or
a common domain name.

15. The method of claim 10, further comprising:
determining whether to log the one or more subsequent packets based on the first packet filtering rule.

16. The method of claim 10, wherein the first packet filtering rule permits packets matching the domain name or the uniform resource identifier to cross the boundary between the protected network and the unprotected network.

17. A computing device located at a boundary between a protected network and an unprotected network external to the protected network, the computing device comprising:
one or more processors; and
memory storing instructions that, when executed by the one or more processors, cause the computing device to:
determine that a first packet of one or more first packets received by the computing device matches a domain name or a uniform resource identifier of one or more packet filtering rules, wherein the one or more packet filtering rules were automatically generated by:
receiving, from a first network threat intelligence provider external to the protected network, the domain name or the uniform resource identifier, wherein the domain name or the uniform resource identifier has been determined, by the first network threat intelligence provider, to be associated with a potential network threat;
generating a first packet filtering rule configured to filter packets matching the domain name or the uniform resource identifier; and
assigning a flow capture directive to the first packet filtering rule, wherein the flow capture directive is configured to cause the computing device to:
cause storage of one or more packets matching the domain name or the uniform resource identifier; and
cause storage, based on a five-tuple field value corresponding to the one or more packets matching the domain name or the uniform resource identifier, of a bidirectional flow of packets subsequent to the one or more packets matching the domain name or the uniform resource identifier;
based on determining that the one or more first packets match the domain name or the uniform resource identifier of the first packet filtering rule:
determining a first 5-tuple of the determined one or more first packets; and
capture, based on the flow capture directive of the first packet filtering rule, one or more first packets that correspond to a first packet flow;
after capturing the one or more first packets:
determine a second 5-tuple of one or more subsequent packets; and
capture, based on the flow capture directive of the first packet filtering rule and based on determining that the second 5-tuple of the one or more subsequent packets corresponds to the first 5-tuple, the one or more subsequent packets of the first packet flow; and
generate, for the captured one or more subsequent packets of the first packet flow, a packet capture file comprising:
raw packet content of the captured one or more first packets and the one or more subsequent packets, and
threat context information comprising an indication of the first packet filtering rule.

18. The computing device of claim 17, wherein the determining that the second 5-tuple of the one or more subsequent packets corresponds to the first 5-tuple comprises determining one or more of:
a source value of the first 5-tuple is a destination value of the second 5-tuple, or
the second 5-tuple indicates that the one or more first packets are traveling in an opposite direction compared to the one or more subsequent packets.

19. The computing device of claim 17, wherein the flow capture directive is configured to cause storage of all packets transiting in either direction of the bidirectional flow.

20. The computing device of claim 17, wherein the instructions, when executed by the one or more processors, cause the computing device to:
receive, from a second network threat intelligence provider, a second domain name or uniform resource identifier; and
generate a third network threat indicator by combining a first portion of the domain name or the uniform resource identifier and a second portion of the second domain name or uniform resource identifier based on common characteristics of the domain name or the uniform resource identifier and the second domain name or uniform resource identifier, wherein generating the first packet filtering rule configured to filter packets matching the domain name or the uniform resource identifier comprises generating the first packet filtering rule such that the first packet filtering rule is configured to filter packets associated with the third network threat indicator.

21. The computing device of claim 20, wherein the common characteristics comprise one or more of:
a common source address,
a common source port,
a common destination address,
a common destination port,
a common protocol type,
a common uniform resource identifier (URI), or
a common domain name.

22. The computing device of claim 17, wherein the instructions, when executed by the one or more processors, cause the computing device to:
determine whether to log the one or more subsequent packets based on the first packet filtering rule.

23. The computing device of claim 17, wherein the first packet filtering rule permits packets matching the domain name or the uniform resource identifier to cross the boundary between the protected network and the unprotected network.

24. A method comprising:
determining, by a computing device located at a boundary between a protected network and an unprotected network external to the protected network, that a first packet of one or more first packets received by the computing device matches a domain name or a uniform resource identifier of one or more packet filtering rules, wherein the one or more packet filtering rules were automatically generated by:
receiving, from a first network threat intelligence provider external to the protected network, the domain name or the uniform resource identifier, wherein the domain name or the uniform resource identifier has been determined, by the first network threat intelligence provider, to be associated with a potential network threat;
generating a first packet filtering rule configured to filter packets matching the domain name or the uniform resource identifier;
assigning a flow capture directive to the first packet filtering rule, wherein the flow capture directive is configured to cause the computing device to:
cause storage of one or more packets matching the domain name or the uniform resource identifier; and
cause storage based on a five-tuple field value corresponding to the one or more packets matching the domain name or the uniform resource identifier, of a bidirectional flow of packets subsequent to the one or more packets matching the domain name or the uniform resource identifier;
based on determining that the one or more first packets match the domain name or the uniform resource identifier of the first packet filtering rule:
determining a first 5-tuple of the determined one or more first packets; and
capture, based on the flow capture directive of the first packet filtering rule, one or more first packets that correspond to a first packet flow;
after capturing the one or more first packets,
determine a second 5-tuple of one or more subsequent packets; and
capture, based on the flow capture directive of the first packet filtering rule and based on determining that the second 5-tuple of the one or more subsequent packets corresponds to the first 5-tuple, the one or more subsequent packets of the first packet flow; and
generating, by the computing device and for the captured one or more subsequent packets of the first packet flow, a packet capture file comprising:
raw packet content of the captured one or more first packets and the one or more subsequent packets, and
threat context information comprising an indication of the first packet filtering rule.

25. The method of claim 24, wherein the determining that the second 5-tuple of the one or more subsequent packets corresponds to the first 5-tuple comprises determining one or more of:
a source value of the first 5-tuple is a destination value of the second 5-tuple, or
the second 5-tuple indicates that the one or more first packets are traveling in an opposite direction compared to the one or more subsequent packets.

26. The method of claim 24, wherein the flow capture directive is configured to cause storage of all packets transiting in either direction of the bidirectional flow.

27. The method of claim 24, further comprising:
receiving, by the computing device and from a second network threat intelligence provider, a second domain name or uniform resource identifier; and
generating a third network threat indicator by combining a first portion of the domain name or the uniform resource identifier and a second portion of the second domain name or uniform resource identifier based on common characteristics of the domain name or the uniform resource identifier and the second domain name or uniform resource identifier, wherein generating the first packet filtering rule configured to filter packets matching the domain name or the uniform resource identifier comprises generating the first packet filtering rule such that the first packet filtering rule is configured to filter packets associated with the third network threat indicator.

28. The method of claim 27, wherein the common characteristics comprise one or more of:
a common source address,
a common source port,
a common destination address,
a common destination port,
a common protocol type,
a common uniform resource identifier (URI), or
a common domain name.

29. The method of claim 24, further comprising:
determining whether to log the one or more subsequent packets based on the first packet filtering rule.

30. The method of claim 24, wherein the first packet filtering rule permits packets matching the domain name or the uniform resource identifier to cross the boundary between the protected network and the unprotected network.

* * * * *